US011245556B2

United States Patent
Ikenaga et al.

(10) Patent No.: US 11,245,556 B2
(45) Date of Patent: Feb. 8, 2022

(54) RESOLVER CORRECTION DEVICE AND METHOD OF CORRECTING THE SAME

(71) Applicant: RENESAS ELECTRONICS CORPORATION, Tokyo (JP)

(72) Inventors: Yoshifumi Ikenaga, Tokyo (JP); Yuji Shimizu, Tokyo (JP); Akane Abe, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/018,208

(22) Filed: Sep. 11, 2020

(65) Prior Publication Data

US 2021/0105162 A1 Apr. 8, 2021

(30) Foreign Application Priority Data

Oct. 8, 2019 (JP) .............................. JP2019-185406

(51) Int. Cl.
| | | |
|---|---|---|
| *H04L 27/20* | (2006.01) | |
| *G01D 5/245* | (2006.01) | |
| *G01D 5/20* | (2006.01) | |
| *G01D 18/00* | (2006.01) | |
| *H04L 7/00* | (2006.01) | |

(52) U.S. Cl.
CPC ....... *H04L 27/2053* (2013.01); *G01D 5/2073* (2013.01); *G01D 5/245* (2013.01); *G01D 18/008* (2013.01); *H04L 7/0008* (2013.01)

(58) Field of Classification Search
CPC . H04L 27/2053; H04L 7/0008; G01D 5/2073; G01D 5/245; G01D 18/008
See application file for complete search history.

(56) References Cited

U.S. PATENT DOCUMENTS

| | | | |
|---|---|---|---|
| 9,641,367 B2 | 5/2017 | Shimizu et al. | |
| 10,498,266 B2 | 12/2019 | Ikenaga | |
| 2015/0158396 A1* | 6/2015 | Walters | B60W 50/02 701/22 |

(Continued)

FOREIGN PATENT DOCUMENTS

| | | |
|---|---|---|
| JP | 2017-032480 A | 2/2017 |
| JP | 2018-031619 A | 3/2018 |

*Primary Examiner* — Jaison Joseph
(74) *Attorney, Agent, or Firm* — McDermott Will & Emery LLP

(57) ABSTRACT

To provide a correction method of resolver correction device and resolver correction device that can reduce rotation angle (the rotation speed) detection error caused by resolver. An excitation signal supply circuit supplies an excitation signal of an excitation frequency to the resolver during a normal operation, for supplying the excitation signals of a plurality of frequencies including the excitation frequency to the first phase shifter or the second phase shifter during a calibration operation. A shift amount searching circuit searches the first shift amount setting value for each frequency of the excitation signal such that the first shift amount becomes 45 degrees, and the second shift amount setting value for each frequency of the excitation signal such that the second shift amount becomes 135 degrees, while referring to the detection result of the phase difference detection circuit during the calibration operation, and stores in the correction table.

20 Claims, 22 Drawing Sheets

(56) References Cited

U.S. PATENT DOCUMENTS

| | | | |
|---|---|---|---|
| 2015/0333686 A1* | 11/2015 | Nakai | G01D 5/2073 |
| | | | 318/400.26 |
| 2015/0357956 A1* | 12/2015 | Shimada | H02P 6/181 |
| | | | 318/400.02 |
| 2017/0041168 A1* | 2/2017 | Shimizu | H04L 27/2053 |
| 2017/0250701 A1* | 8/2017 | Hiroshima | G01B 7/30 |
| 2017/0317682 A1* | 11/2017 | Shimizu | H02P 6/16 |
| 2018/0062548 A1* | 3/2018 | Ikenaga | H02P 6/153 |
| 2020/0116531 A1* | 4/2020 | Shimada | G01D 5/16 |

* cited by examiner

FIG. 3

CTBLa

| fres[kHz] | 15 | 16 | 17 | 18 | 19 | 20 | 21 | 22 | 23 | 24 | 25 |
|---|---|---|---|---|---|---|---|---|---|---|---|
| PWMD1 | 0.9 | 0.55 | 0.5 | 0.45 | 0.4 | 0.35 | 0.3 | 0.25 | 0.2 | 0.15 | 0.1 |
| PWMD2 | 0.8 | 0.7 | 0.6 | 0.65 | 0.6 | 0.55 | 0.4 | 0.35 | 0.3 | 0.25 | 0.2 |

FIG. 7

CTBLb

| fres[kHz] | 15 | 16 | 17 | 18 | 19 | 20 | 21 | 22 | 23 | 24 | 25 |
|---|---|---|---|---|---|---|---|---|---|---|---|
| $\Delta\varphi_0$[degrees] | 10 | 8 | 6 | 4 | 2 | 0 | -2 | -4 | -6 | -8 | -10 |
| $\Delta\varphi_1$[degrees] | 2 | 1 | 0.5 | 0.2 | 0.1 | 0 | 0.1 | 0.2 | 0.4 | 0.8 | 1.5 |

FIG. 13

CTBLc

| fres [kHz] | 15 | 16 | 17 | 18 | 19 | 20 | 21 | 22 | 23 | 24 | 25 |
|---|---|---|---|---|---|---|---|---|---|---|---|
| $\Delta\varphi_0$[degrees] | 1 | 0.9 | 0.8 | 0.7 | 0.6 | 0.5 | 0.4 | 0.3 | 0.2 | 0.1 | 0 |
| $\Delta\varphi_1$[degrees] | 0.1 | 0.09 | 0.08 | 0.07 | 0.06 | 0.05 | 0.06 | 0.04 | 0.05 | 0.06 | 0.07 |
| PWMD1 | 0.9 | 0.55 | 0.5 | 0.45 | 0.4 | 0.35 | 0.3 | 0.25 | 0.2 | 0.15 | 0.1 |
| PWMD2 | 0.8 | 0.7 | 0.6 | 0.65 | 0.6 | 0.55 | 0.4 | 0.35 | 0.3 | 0.25 | 0.2 |

RESOLVER CORRECTION DEVICE AND METHOD OF CORRECTING THE SAME

CROSS-REFERENCE TO RELATED APPLICATIONS

The disclosure of Japanese Patent Application No. 2019-185406 filed on Oct. 8, 2019 including the specification, drawings and abstract is incorporated herein by reference in its entirety.

BACKGROUND

It relates to resolver correction device and correction method of resolver correction device, e.g. to a technique for correcting errors occurring in RDC (Resolver to Digital Converter) circuit.

There are disclosed techniques listed below.
[Patent Document 1] Japanese Unexamined Patent Application Publication 2017-32480
[Patent Document 2] Japanese Unexamined Patent Application Publication 2018-31619

Patent Document 1 discloses a signal converter comprising a first phase shifter for shifting phase of the first phase signal from resolver and a second phase shifter for shifting phase of the second phase signal from resolver and operating with phase difference between shift amount of the first phase shifter and shift amount of the second phase shifter set at a predetermined difference (90 degrees). Patent Document 2 discloses a resolver correction device that corrects shift amount setting value of phase shifter to be proportional to rotation speed of motor.

SUMMARY

Resolver is known using a rotation angle (rotation speed) such as motor as a detect sensor. Detection signal from resolver is processed in the RDC circuit. As a process method of the RDC circuit, a method of generating a predetermined phase difference (90 degrees) by using two phase shifter circuits as shown in Patent Document 1 is known. Using such a scheme, since shift amount of the two phase shifter varies to the same degrees with respect to the change in the signaling frequency, it is possible to create a predetermined phase difference (90 degrees) in a certain frequency band.

However, the signal frequency is a value that is modulated according to rotation speed of motor, etc. For this reason, in the system of Patent Document 1, for example, when frequency modulation quantity is large, it may be difficult to keep phase difference at a predetermined phase difference (90 degrees). The error occurring for this predetermined phase difference (90 degrees) leads to a detection error of rotation angle (rotation speed). Therefore, as shown in Patent Document 2, it is conceivable to correct shift amount setting value of phase shifter so that it is proportional to rotation speed of motor. However, shift amount setting value compensation required is not necessarily proportional to rotation speed of motor.

The embodiments described later have been made in view of such, and other problems and novel features will become apparent from the description and the accompanying drawings of the present specification.

A resolver correction device according to one embodiment comprises: a first phase shifter for outputting a first phase signal by shifting a phase of a first detection signal is one of quadrature detection signals of the resolver by a first shift amount in accordance with a first shift amount setting value; a second phase shifter for outputting a second phase signal by shifting a phase of a second detection signal is the other of the quadrature detection signals by a second shift amount in accordance with a second shift amount setting value; an add circuit for outputting a third phase signal by adding the first phase signal and the second phase signal; an excitation signal supply circuit for supplying an excitation signal of an excitation frequency to the resolver during a normal operation, for supplying the excitation signals of a plurality of frequencies including the excitation frequency to the first phase shifter or the second phase shifter during a calibration operation; a phase difference detection circuit detecting a rotation angle of the resolver during the normal operation, and detecting the first shift amount or the second shift amount during the calibration operation, by detecting an phase difference between the excitation signal from the excitation signal supply circuit and the third phase signal from the add circuit; a shift amount searching circuit for searching the first shift amount setting value for each frequency of the excitation signal such that the first shift amount becomes a first specified amount, and for searching the second shift amount setting value for each frequency of the excitation signal such that the second shift amount becomes a second specified amount different by 90 degrees from the first specified amount, while referring to the detection result of the phase difference detection circuit during the calibration operation; and a storage circuit for storing the first shift amount setting value and the second shift amount setting value for each frequency of the excitation signal obtained by a search result of the shift amount searching circuit as a correction table.

According to the embodiment described above, the detection error of rotation angle, rotation speed, by resolver can be reduced.

BRIEF DESCRIPTION OF THE DRAWINGS

FIG. 3 is a schematic diagram showing a configuration example of a correction table in FIG. 1.

FIG. 7 is a schematic diagram showing a configuration example of the correction table in FIG. 6A.

FIG. 13 is a schematic diagram showing a configuration example of the correction table in FIG. 12A.

DETAILED DESCRIPTION

Figure 1:
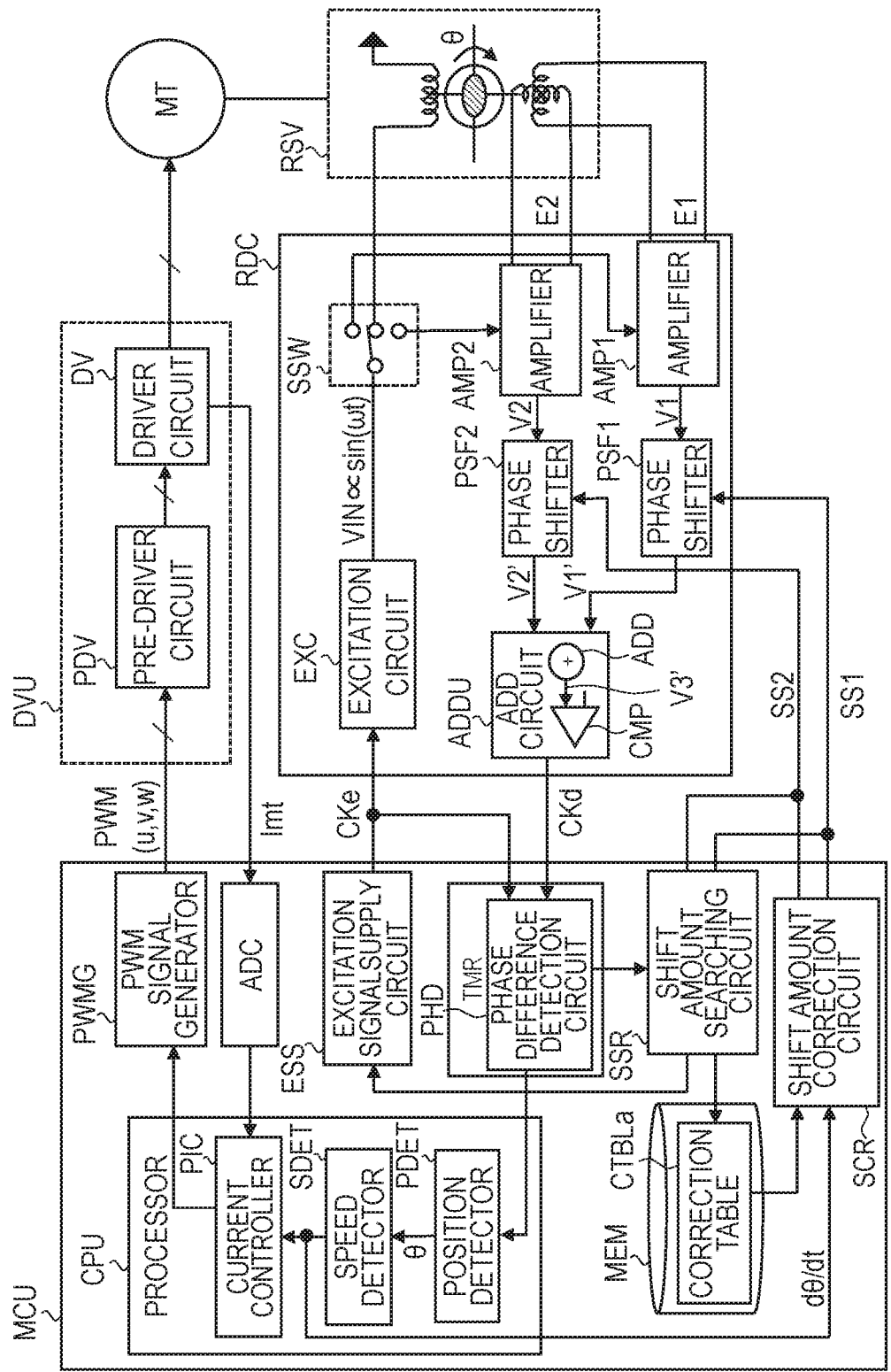
FIG. 1 is a schematic diagram showing a configuration example of a motor system including a resolver correction device according to a first embodiment.

In the following embodiments, when it is necessary for convenience, it is to be described by dividing it into sections or embodiments, but, unless otherwise specified, they are not irrelevant to one another and one is related to some or all of the other, such as modified example, detail, supplemental explanations, and the like. In the following embodiments, the number of elements or the like (including the number, number, quantity, range, and the like) is not limited to the specific number except the case where it is specified in particular or the case where it is obviously limited to the specific number in principle, and may be a specific number or more or less.

Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

The circuit elements constituting the functional blocks of the embodiment are formed on a semiconductor substrate such as single-crystal silicon by integrated circuit techniques such as, but not limited to, known CMOS, complementary MOS transistors.

Hereinafter, embodiments of the present invention are described in detail with reference to the drawings. In all the drawings for explaining the embodiments, the same members are denoted by the same reference numerals in principle, and repetitive descriptions thereof are omitted.

First Embodiment

<Resolver Correction Device Schematic>

FIG. 1 is a schematic diagram showing an exemplary configuration of a motor system including a resolver correction device according to first embodiment. The motor system shown in FIG. 1 comprises a motor MT, a driver unit DVU that drives the motor MT, a resolver RSV, a resolver digital converter RDC, and a microcontroller MCU, hereinafter referred to as the microcomputer. The resolver correction device of first embodiment corresponds to the resolver digital converter RDC and the microcomputer MCU.

Each of the resolver digital converter RDC and the microcomputer MCU is composed of, for example, individual semiconductor chips, IC chips. However, the mounting mode is not limited to this, and can be changed as appropriate. Part or all of the various circuit blocks included in the microcomputer MCU can be replaced with FPGA, Field Programmable Gate Array, ASIC, Application Specific Integrated Circuit, or the like. That is, the various circuit blocks may be appropriately implemented using hardware processing, software processing, or a combination thereof.

Driver unit DVU includes, for example, a driver circuit DV such as a three-phase inverter, and a pre-driver circuit PDV for driving each switching element in the driver circuit DV (not shown). Pre-driver circuit PDV, for example, based on the three-phase PWM, Pulse Width Modulation, signal PWMu, PWMv, PWMw outputted from the microcomputer MCU, switching control of the respective switching elements in the driver circuit DV.

The resolver RSV is, for example, installed on a rotating shaft of the motor MT, detects the rotation angle θ of the motor MT, and outputs a detection signal E1 and a detection signal E2 which are quadrature detection signal, signals whose phase differs from each other by 90 degrees, reflecting the rotation angle θ. The resolver digital converter RDC process the detection signals E1, E2 from the resolver RSV. Specifically, the resolver digital converter RDC includes a selection switch SSW in addition to an excitation circuit EXC, differential amplifier AMP1, AMP2, phase shifters PSF1, PSF2, and the add circuit ADDU.

The excitation circuit EXC, by performing filtering process or the like in response to an excitation clock signal CKe of an excitation frequency fexc supplied from the microcomputer MCU, a sine wave of the excitation frequency fexc (angular velocity $\omega=2\pi\times fexc$) the excitation signal VIN ($\propto \sin(\omega t)$) to output. The resolver RSV receives the excitation signal VIN via the selection switch SSW, and outputs the detection signals E1 and E2. At this time, in accordance with the rotation angle, electric angle, θ of the motor MT, the detection signal E1 becomes "E1 $\propto \sin(\theta)\times\sin(\omega t)$", the detection signal E2 becomes "E2 $\propto \cos(\theta)\times\sin(\omega t)$".

Amplifiers AMP1 and AMP2 differentially amplify the detection signals E1 and E2 from the resolver RSV, respectively, and outputs phase signals V1 and V2. The phase shifter PSF 1 outputs a phase signal V1' by shifting phase of the phase signal V1 (and thus the detection signal E1) by a predetermined shift amount according to a shift amount setting value SS1 from the microcomputer MCU. The phase shifter PSF2 outputs a phase signal V2' by shifting phase of the phase signal V2 (and thus the detection signal E2) by the predetermined shift amount according to a shift amount setting value SS2 from the microcomputer MCU.

A shift amount of the phase shifter PSF2 is set so as to differ from a shift amount of the phase shifter PSF1 by 90 degrees (π/2). As a result, when the phase signal V1' is "V1∝sin(θ)×sin(ωt)", the phase signal V2' is, for example, "V2'∝ cos(θ)×sin(ωt−π/2)=−cos(θ)×cos(ωt)".

Add circuit ADDU outputs the phase signal, a detection clock signal CKd, by adding the phase signal V1' from the phase shifter PSF1 and the phase signal V2' from the phase shifter PSF2. Specifically, the add circuit ADDU includes an adder ADD for adding the phase signal V1' and the phase signal V2', and a comparator CMP for converting a phase signal V3'(=V1'+V2') as a result of the addition into a rectangular wave, and outputs the phase signal V3' as the detection clock signal CKd via the comparator CMP. As a result, the phase signal V3'(=V1'+V2') becomes "V3'∝ cos (ωt+θ)", and the detection clock signal CKd becomes a signal synchronized with phase of the phase signal V3'.

The Microcomputer MCU includes a PWM signal generator PWMG, an analog-to-digital converter ADC, an excitation signal supply circuit ESS, a timer TMR including a phase difference detection circuit PHD, a processor CPU, in addition to a shift amount searching circuit SSR, a shift amount correction circuit SCR, and the storage circuit MEM storing a correction table CTBLa. The processor CPU comprises a position detector PDET, a speed detector SDET and current controller PIC implemented by software-processing by the processor CPU. The shift amount searching circuit SSR, the shift amount correction circuit SCR, and the correction table CTBLa will be described later.

Excitation signal supply circuit ESS, for example, using a timer or the like, generates the excitation clock signal CKe to be the base of the excitation signal VIN, and supplies to the excitation circuit EXC of the resolver digital converter RDC. Phase difference detection circuit PHD detect a phase difference of the excitation clock signal CKe and the detection clock signal CKd from the add circuit ADDU as the timer TMR count. Position detector PDET detect rotation angle θ of the resolver RSV by converting the count value detected by this phase difference detection circuit PHD into an angle. Thus, substantially, the phase difference detection circuit PHD can detect rotation angle θ of the resolver RSV (and hence the motor MT) by detecting phase difference between the excitation signal VIN(∝ sin(ωt)) from the excitation signal supply circuit ESS and the phase signal V3'(∝ cos(ωt+θ)) from the add circuit ADDU.

The speed detector SDET detects a rotation speed (dθ/dt) of the resolver RSV based on a change rate of the rotation angle θ of the resolver RSV detected by the position detector PDET, substantially the phase difference detection circuit PHD. The analog-to-digital converter ADC converts, for example, the drive current Imt of the motor MT detected via a current sensor (not shown) in the driver circuitry DV into a digital value.

Current controller PIC is, for example, PI (proportional (P)·integral (I)) controller or the like, determines the target current based on the error between the target rotation speed and the rotation speed detected by the speed detector SDET, the target current, based on the error between the drive current Imt converted by the analog-to-digital converter ADC defining duty cycle of a PWM signal. The PWM signal generator PWMG, for example, constituted by a timer or the like, based on duty cycle defined by the current controller PIC, generates the PWM signals PWMu, PWMv, PWMw.

<Phase Shifter Configuration>

Figure 2:
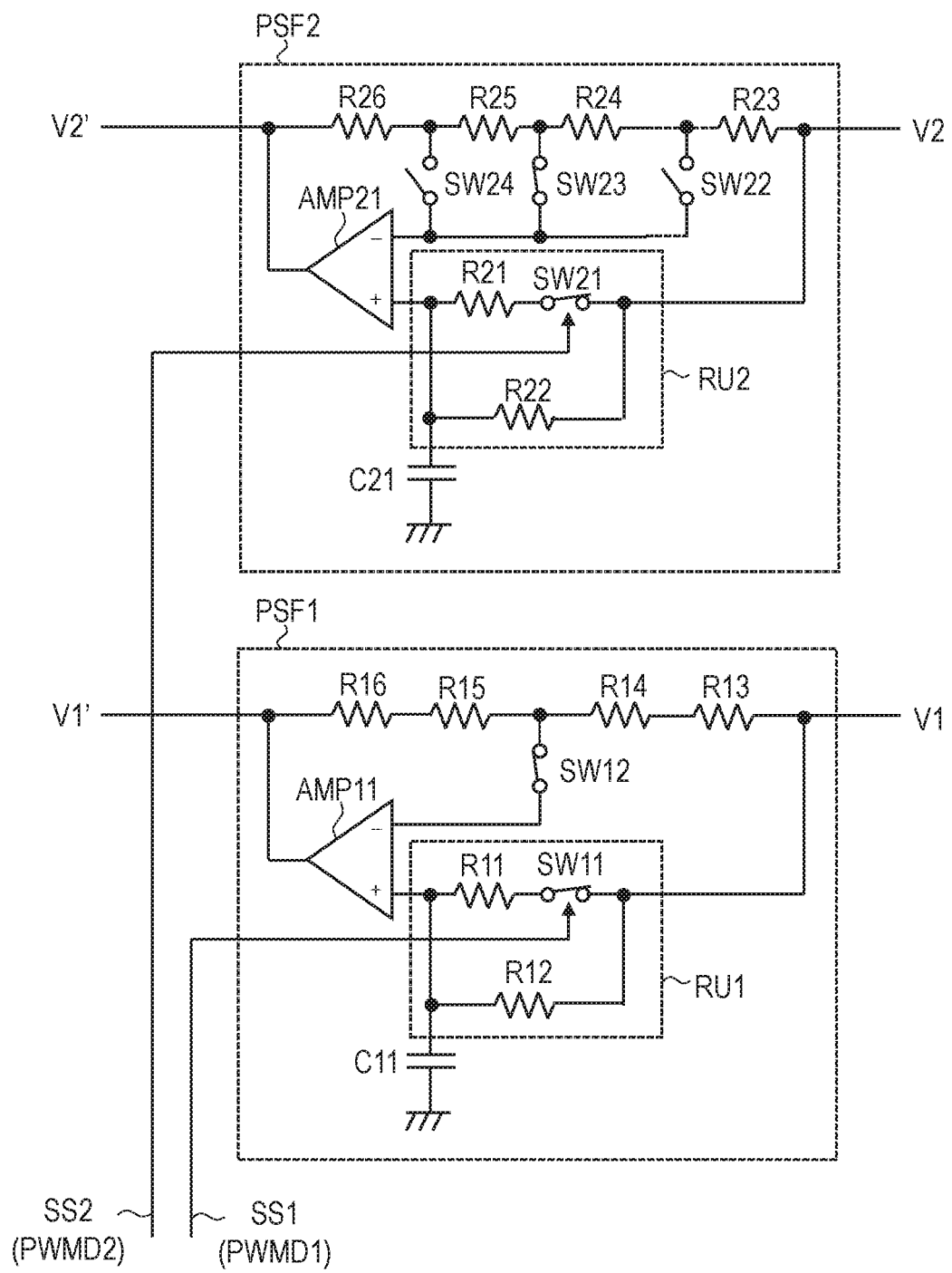
FIG. 2 is a circuit diagram showing a configuration example of a phase shifter in FIG. 1.

FIG. 2 is a circuit diagram showing an exemplary configuration of the phase shifter in FIG. 1. The phase shifter PSF 1 is, for example, an all-pass filtering (APF), and includes a resistor unit RU1, a capacitance C11, a plurality of resistor R13 to R16, a switch SW12, and an amplifier AMP11. The resistor unit RU1 and the capacitance C11 constitute a RC circuit and transmits the phase signal V1 to the (+) input terminal of the amplifier AMP11. Resistors R13 and R14 are inputs resistor, and transmit the phase signal V1 to the (−) input terminal of the amplifier AMP11 via the switch SW12. Resistors R15 and R16 are feedback resistor, and negatively feedback the output terminal of the amplifier AMP11 to the (−) input terminal of the amplifier AMP11 via the switch SW12.

The resistor unit RU1 includes, for example, a plurality of resistor R11 and R12 connected in parallel, and a switch SW11 for switching enable and disable of resistor R11. The effective resistor of the resistor unit RU1 is controlled by switching the switch SW11 on or off at a predetermined time ratio based on the shift amount setting value SS1. That is, in this instance, the shift amount setting value SS1 is duty cycle PWMD1 of the PWM signal, and on or off the switch SW11 is controlled by the PWM signal having duty cycle PWMD1 concerned. As described above, the phase shifter PSF1 controls the RC circuit delay amount, and thus the shift amount, by switching enable and disable for a part of the plurality of resistor R11 and R12 in the RC circuit, the resistor unit RU1, by the PWM signal.

Similarly, the phase shifter PSF2 is, for example, an all-pass filtering, APF, and includes a resistor unit RU2, a capacitance C21, a plurality of resistor R23 to R26, switches SW22 to SW24, and an amplifier AMP21. The resistor unit RU2 and the capacitance C21 constitute the RC circuit and transmit the phase signal V2 to the (+) input terminal of the amplifier AMP21. Resistors R23-R26 are the input resistor or feedback resistor to the (−) input terminal of the amplifier AMP21. The ratio between the input resistor and the feedback resistor can be set variably by the switches SW22 to SW24.

The resistor unit RU2 includes a plurality of resistor R21 and R22 connected in parallel, and a switch SW21 for switching enable and disable of resistor R21, similarly to the resistor unit RU1. The shift amount setting value SS2 is duty cycle PWMD2 of the PWM signal, the on or off the switch SW21 is controlled by the PWM signal having duty cycle PWMD2. As described above, the phase shifter PSF2 also controls the shift amount by switching enable or disable of a part of the plurality of resistor R21 and R22 in the RC circuit, the resistor unit RU2, by the PWM signal.

Incidentally, a plurality of resistor in the resistor unit may be a series connection is not limited to parallel connection. In this case, a switch may be provided to bypass a portion of resistor connected in series. In addition, although the effective resistor of the resistor unit is controlled by the PWM signal, it is not limited to this, and various variable resistor schemes can be used. However, by using the PWM control method, the effective resistor resolution can be enhanced without complicating the hardware. That is, the higher duty cycle setting resolution of the PWM signal by the microcomputer MCUs (and hence the higher the clocking frequency), the higher the resolution of the effective resistor. In addition, although resistor in the RC circuit is variably controlled here, the capacitance may be variably controlled instead.

<Prerequisite Problems>

Figure 18A:
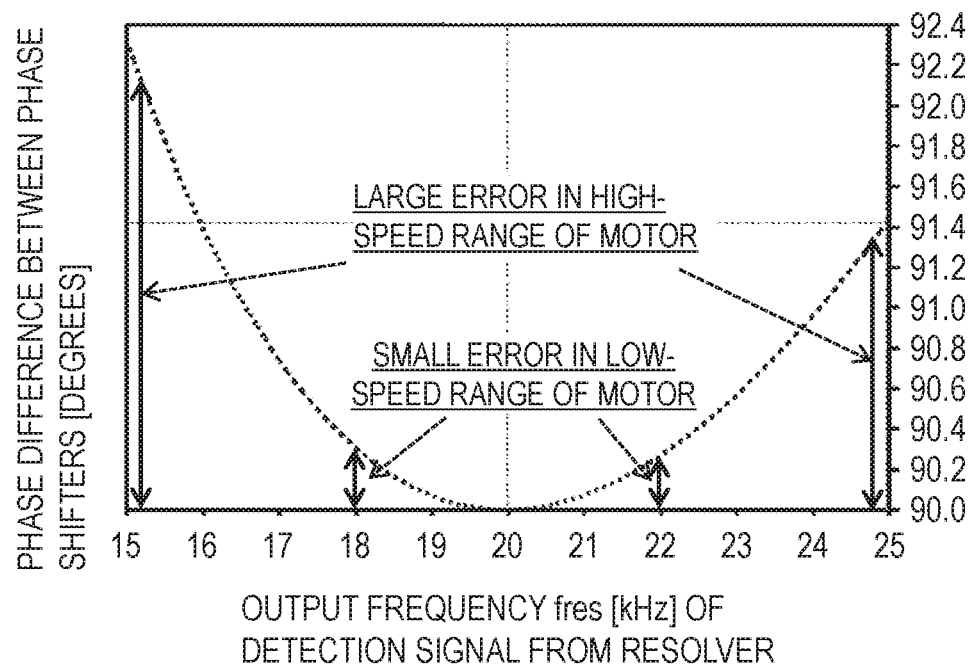
FIG. 18A is a diagram showing examples of the characteristics of phase shifter in FIG. 1.
Figure 18B:
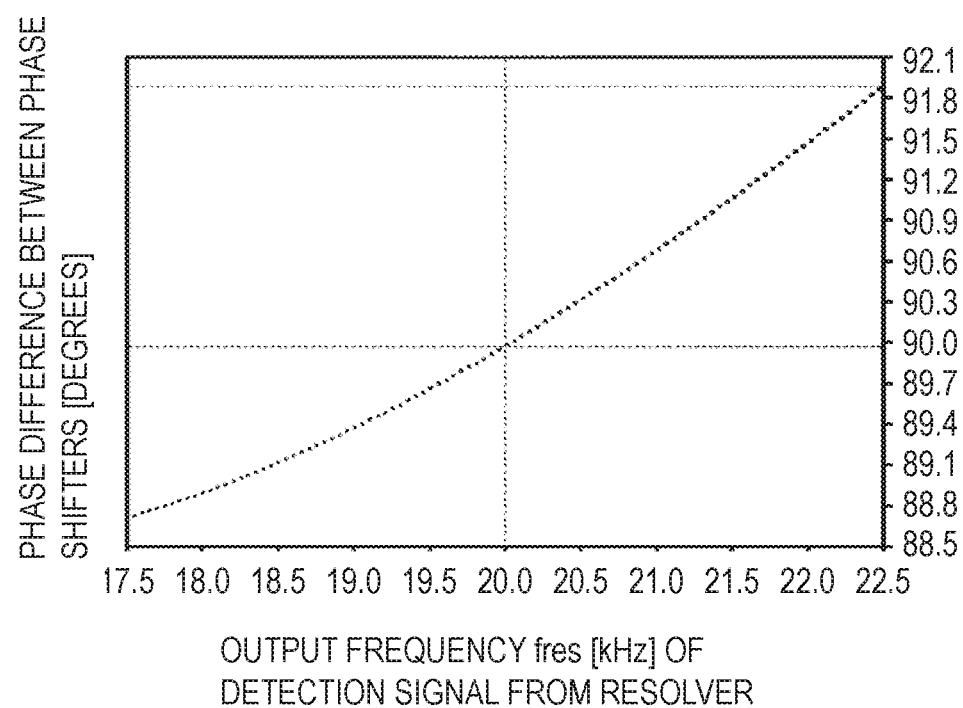
FIG. 18B is a diagram showing examples of the characteristics of the phase shifter in FIG. 1.

FIGS. 18A and 18B are diagrams showing examples of the characteristics of the phase shifter in FIG. 1. In FIGS. 18A and 18B, the horizontal axis is an output frequency fres [kHz] of the detection signals E1, E2 from the resolver RSV, and the vertical axis is phase difference [degrees] of the shift amount between the two phase shifters PSF1, PSF2. FIG. 18A shows characteristics when the shift amount setting value SS1 with shift amount of 45 degrees of the phase shifter PSF1 and the shift amount setting value SS2 with shift amount of 135 degrees of the phase shifter PSF2 (i.e., phase difference 90 degrees) are defined for the excitation frequency fexc (20 kHz in this case). FIG. 18B shows characteristics when the shift amount setting value SS1 with shift amount of 55 degrees of the phase shifter PSF1 and the shift amount setting value SS2 with shift amount of 145 degrees (i.e., phase difference 90 degrees) of the phase shifter PSF2 are defined for the excitation frequency fexc (20 kHz in this case).

In FIG. 18A and FIG. 18B, for example, when the rotation speed fm [rpm] of the motor MT (the resolver RSV) is zero, the output frequency fres is equal to the excitation frequency fexc($=\omega/2\pi$) of the excitation signal VIN value (20 kHz). In this instance, as shown in FIG. 18A and FIG. 18B, if the shift amount setting values SS1 and SS2 of the phase shifters PSF1 and PSF2 are determined so that phase difference between the two phase shifters PSF1 and PSF2 is 90 degrees, phase difference (90 degrees) as set is obtained.

On the other hand, if the rotation speed fm [rpm] of the motor MT (the resolver RSV) is non-zero, the output frequency fres is a value that is modulated according to the rotation speed fm of the motor MT. Consequently, the output frequency fres becomes the value of equation (1) using the excitation frequency fexc($=\omega/2\pi$), the rotation speed fm, and the number of poles Np of the resolver RSV. Thus, the output frequency fres, for example, when the excitation frequency fexc is 20 kHz, becomes higher than 20 kHz when the motor MT rotates forward, lower than 20 kHz when the motor MT rotates backward.

$$fres=fexc+(fm/60)\times Np: \quad\quad\quad\quad \text{equation (1)}$$

Here, first, a case in which the method of Patent Document 1 described above is used will be described. When the two phase shifters PSF1 and PSF2 are used as in Patent Document 1, phase difference can be kept at approximately 90 degrees in the vicinity of the excitation frequency fexc (20 kHz), as shown in FIG. 18A. Therefore, when the rotation speed fm of the motor MT is low or the number of poles Np of the resolver RSV is small, and only ±2 kHz of modulation is applied to 20 kHz, phase difference setting error (about 0.2 degrees in this example) may be acceptable. However, if the rotation speed fm of the motor MT is high or the number of poles Np of the resolver RSV is high, for example, 50 poles, and so on, the modulation of about ±5 kHz is applied to 20 kHz, the setting error of phase difference (in this example, about 1.4 degrees to 2.2 degrees) may be unacceptable.

In the phase shifters PSF1 and PSF2, as shown in FIGS. 18A and 18B, the characteristics of the setting error of phase difference with respect to the output frequency fres change in accordance with the values of the shift amount setting values SS1 and SS2 with respect to the phase shifters PSF1 and PSF2, respectively. Therefore, in order to determine the characteristics of the setting error of phase difference as designed, it is required to accurately determine the shift amount setting values SS1, SS2. However, it is not easy to verify that actual shift amount is in the shift amount setting value state with the predetermined the shift amount setting values SS1 and SS2 set in the respective phase shifters PSF1 and PSF2. Consequently, there is a fear that phase difference setting error cannot be sufficiently reduced without obtaining the characteristics as designed.

Next, a case in which the method of Patent Document 2 described above is used will be described. In the method of Patent Document 2, for example, in FIG. 18A, if the output frequency fres changes in accordance with the rotation of the motor MT, one of the shift amount setting values SS1, SS2 of the phase shifters PSF1, PSF2 is proportional to the rotation speed fm of the motor MT It is controlled (correction). For example, by correcting one of the shift amount setting values SS1 and SS2 using a linear characteristic such that the linear characteristic becomes zero at 20 kHz and −1.4 degrees at 25 kHz, phase difference can be maintained at approximately 90 degrees even when the output frequency fres changes.

However, the corrected quantity of the shift amount setting value originally required is not necessarily proportional to the rotation speed fm of the motor MT. That is, as shown in FIG. 18A and FIG. 18B, the relation between the rotation speed fm (and hence the output frequency fres) of the motor MT and the corrected quantity of the required the shift amount setting value also differs depending on the magnitude of the original the shift amount setting value. Therefore, for example, when the correction amount of the shift amount setting value in the range of 20 kHz to 15 kHz in FIG. 18A is applied to FIG. 18B, since the polarity of the correction amount originally required in FIG. 18A and FIG. 18B is different, conversely, phase difference setting error will be increased.

In addition, in Patent Document 2 method, the shift amount setting value of the phase shifters PSF1 and PSF2 must be controlled, corrected, after the rotation speed fm of the motor MT is detected. In this case, a control delay occurs. This control delay may not sufficiently reduce phase difference setting error.

<Shift Amount Correction Method>

Therefore, the resolver correction device of FIG. 1 includes the shift amount searching circuit SSR, the shift amount correction circuit SCR, and the correction table CTBLa. The shift amount searching circuit SSR and the shift amount correction circuit SCR are implemented, for example, by software-processing by processor CPU, but may be implemented in other implementations. Based on an instruction from the shift amount searching circuit SSR, the selection switch SSW selects which of the resolver RSV, the phase shifter PSF1, and the phase shifter PSF2 is to be supplied with the excitation signal VIN supplied from the excitation signal supply circuit ESS via the excitation circuit EXC.

Here, the resolver correction device of FIG. 1 performs a calibration operation for correcting the shift amount of the phase shifters PSF1 and PSF2 by adding the rotation angle θ when the motor MT are rotationally driven to detect a normal operation. The shift amount searching circuit SSR are activated at the calibration operation. Excitation signal supply circuit ESS supplies the excitation clock signal CKe (and thus the excitation signal VIN) of the excitation frequency fexc to the resolver RSV via the selection switch SSW at the normal operation. On the other hand, when the calibration operation, the excitation signal supply circuit ESS supplies the excitation signal VIN of a plurality of frequency including the excitation frequency fexc to the phase shifter PSF1 or the phase shifter PSF2 via the selection switch SSW based on an instruction from the shift amount searching circuit SSR.

Phase difference detection circuit PHD detect phase difference between the excitation clock signal CKe (and thus the excitation signal VIN) from the excitation signal supply circuit ESS and the detection clock signal CKd (and hence the phase signal V3') from the add circuit ADDU, as described in FIG. 1. Thus, the phase difference detection circuit PHD detects the rotation angle θ of the resolver RSV at the time of the normal operation, and detect the shift amount of the phase shifter PSF1 or the shift amount of the phase shifter PSF2 at the time of the calibration operation.

In the calibration operation, if the excitation signal VIN is supplied to the phase shifter PSF1 via the selection switch SSW, the phase signal V2' from the phase shifter PSF2 to the add circuit ADDU is null. Therefore, the phase difference detection circuit PHD can detect the shift amount of the phase shifter PSF1 by turning detect phase difference between the detection clock signal CKd and the excitation clock signal CKe corresponding to the phase signal V1' from the add circuit ADDU. The same applies when the excitation signal VIN is supplied to the phase shifter PSF2 via the selection switch SSW.

The shift amount searching circuit SSR instructs the excitation signal supply circuit ESS to frequency of the excitation signal VIN at the time of the calibration operation, and search the shift amount setting value SS1 such that the shift amount of the phase shifter PSF1 becomes a specified amount (e.g., 45 degrees) for each frequency while referring to detection result of the phase difference detection circuit PHD for each frequency. Similarly, the shift amount searching circuit SSR searches the shift amount setting value SS2 such that the shift amount of the phase shifter PSF2 is the specified amount (e.g., 135 degrees) for the phase shifter PSF2 at every frequency of the excitation signal VIN. The shift amount searching circuit SSR registers a search result in the correction table CTBLa.

FIG. 3 is a schematic diagram showing an exemplary configuration of the correction table in FIG. 1. As shown in FIG. 3, the correction table CTBLa stores the shift amount setting values SS1, SS2 for each frequency of the excitation signal VIN obtained by the search result of the shift amount searching circuit SSR. In this case, the shift amount setting values SS1 and SS2 are duty cycle PWMD1 and PWMD2 of the PWM signal, respectively, as described in FIG. 2.

In the calibration operation, frequency of the excitation signal VIN can be regarded as the output frequency fres described in FIG. 18A and FIG. 18B. The maximum value of frequency of the excitation signal VIN is a value corresponding to "the excitation frequency fexc+number of poles Np×positive rotational maximum rotation speed [rps]", for example, 25 kHz the excitation frequency fexc as 20 kHz. Similarly, the minimum value of frequency of the excitation signal VIN is a value corresponding to "the excitation frequency fexc−number of poles Np×reverse rotation maximum rotation speed [rps]", for example, 15 kHz. In addition, frequency of the excitation signal VIN is set here to 1 kHz increments between the max and min values.

In FIG. 1, the shift amount correction circuit SCR calculate the output frequency fres based on equation (1) at the normal operation using the rotation speed (dθ/dt=fm) detected by the speed detector SDET, the excitation frequency fexc of the excitation signal VIN, and pole number Np of the resolver RSV. The shift amount correction circuit SCR acquires the shift amount setting values SS1 and SS2 by referring to the correction table CTBLa using the output frequency fres as search keys, and sets them in the phase shifters PSF1 and PSF2, respectively. In this case, when the calculated output frequency fres is located between a plurality of the output frequency fres (i.e., discrete values) stored in the correction table CTBLa, the shift amount correction circuit SCR determines the corresponding the shift amount setting values SS1, SS2 by, for example, linearly interpolating between the output frequency fres.

In FIG. 1, the calibration operation is performed by providing the selection switch SSW, but the calibration operation can also be performed in a configuration that does not provide the selection switch SSW. Specifically, while the excitation signal supply circuit ESS supplies the excitation signal VIN to the resolver RSV, the revolution of the motor MT (the resolver RSV) may be controlled to stopped state. In this situation, the output frequency fres of the detection signals E1, E2 is equal to frequency of the excitation signal VIN.

In this condition, the shift amount searching circuit SSR, for example, by deactivating one of the phase shifters PSF1, PSF2, or the like, turns disable one of the phase signals V1', V2'. Consequently, the add circuit ADDU can output one of the phase signals V1' and V2' as the phase signal V3'. However, in this instance, the shift amount of the phase shifters PSF1, PSF2 detected by the phase difference detection circuit PHD may include errors that depend on the configuration of the resolver RSV. From the viewpoint of eliminating such errors, it is desirable to provide the selection switch SSW.

<Operation of Resolver Correction Device>

Figure 4:
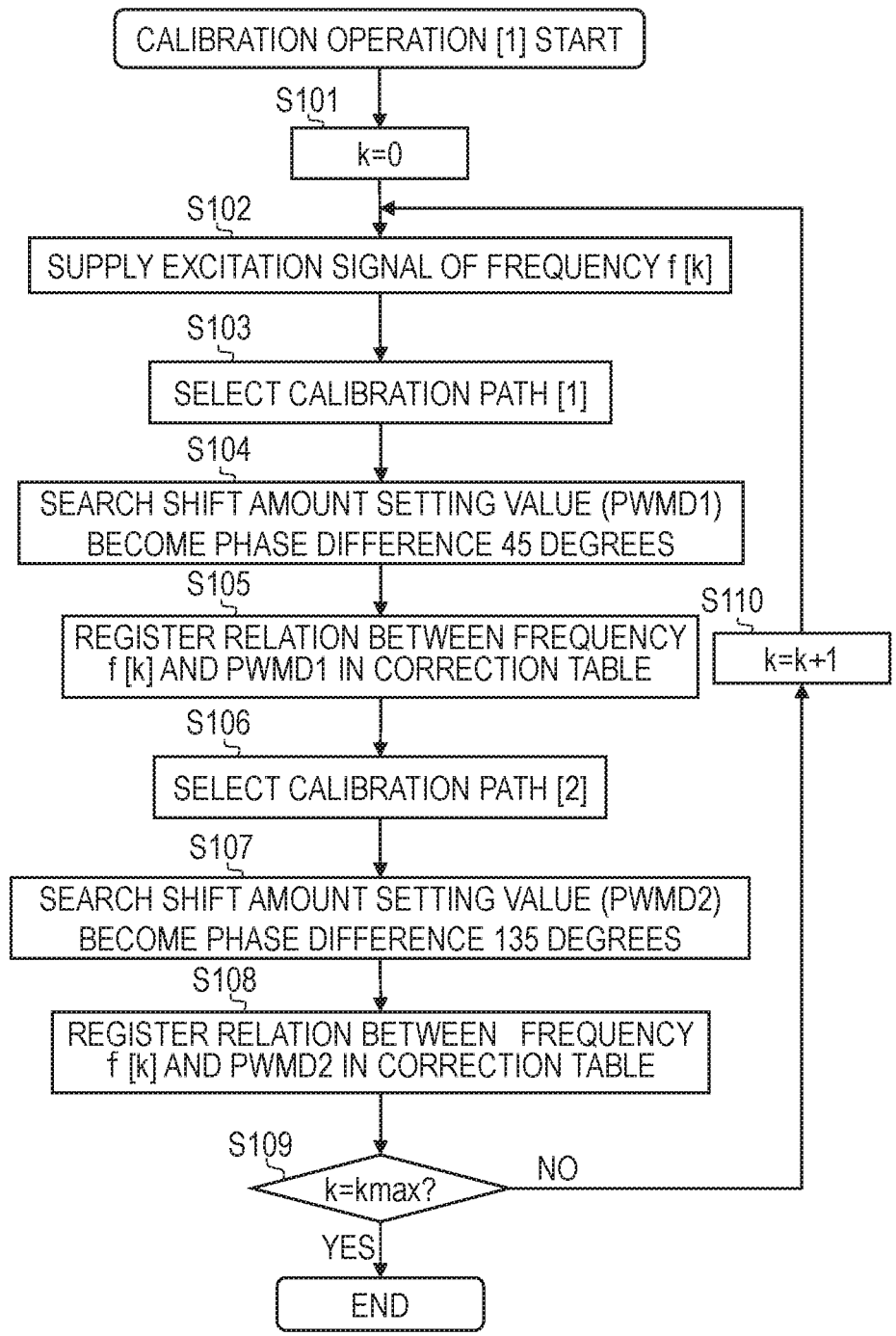
FIG. 4 is a flowchart showing an exemplary process content at the time of calibration operation [1] in resolver correction device in FIG. 1.

FIG. 4 is a flowchart showing an exemplary process content at the time of the calibration operation [1] in the resolver correction device in FIG. 1. In FIG. 4, the excitation signal supply circuit ESS supplies the excitation clock signal CKe (and thus the excitation signal VIN) of frequency f [k] as k=0 (step S101) in response to an instruction from the shift amount searching circuit SSR (step S102). Subsequently, the selection switch SSW selects the calibration path [1] for supplying the excitation signal VIN to the phase shifter PSF1 in response to an instruction from the shift amount searching circuit SSR (step S103).

Next, the shift amount searching circuit SSR search the shift amount setting value SS1 in which the shift amount detected by the phase difference detection circuit PHD becomes the specified amount (here, 45 degrees) while sequentially changing the shift amount setting value SS1 (duty cycle PWMD1) (S104). Then, the shift amount searching circuit SSR registers the corresponding relation between frequency f [k] of the step S102 and the shift amount setting value SS1 (duty cycle PWMD1), which is search result of the step S104, in the correction table CTBLa (step S105).

Subsequently, in the steps S106 to S108, the same process as in the steps S103 to S105 is performed for the calibration path [2] for supplying the excitation signal VIN to the phase shifter PSF2. That is, the selection switch SSW selects the calibration pass [2] (step S106), and the shift amount searching circuit SSR search (step S107) the shift amount setting value SS2 (duty cycle PWMD2) in which the shift amount detected by the phase difference detection circuit PHD becomes the specified amount (here, 135 degrees). Then, the shift amount searching circuit SSR registers the corresponding relation between frequency f [k] and the shift amount setting value SS2 (duty cycle PWMD2) in the correction table CTBLa (step S108).

Thereafter, the shift amount searching circuit SSR repeats the process of the steps S102 to S108 until k=kmax while sequentially changing k (steps S109, S110). As a result, in the correction table CTBLa of FIG. 3, frequency f [k] of the step S102 is changed in 1 kHz increments from 15 kHz to 25 kHz, and the shift amount setting values SS1 and SS2 (duty cycle PWMD1 and PWMD2) for each frequency f [k] are registered.

Figure 5:
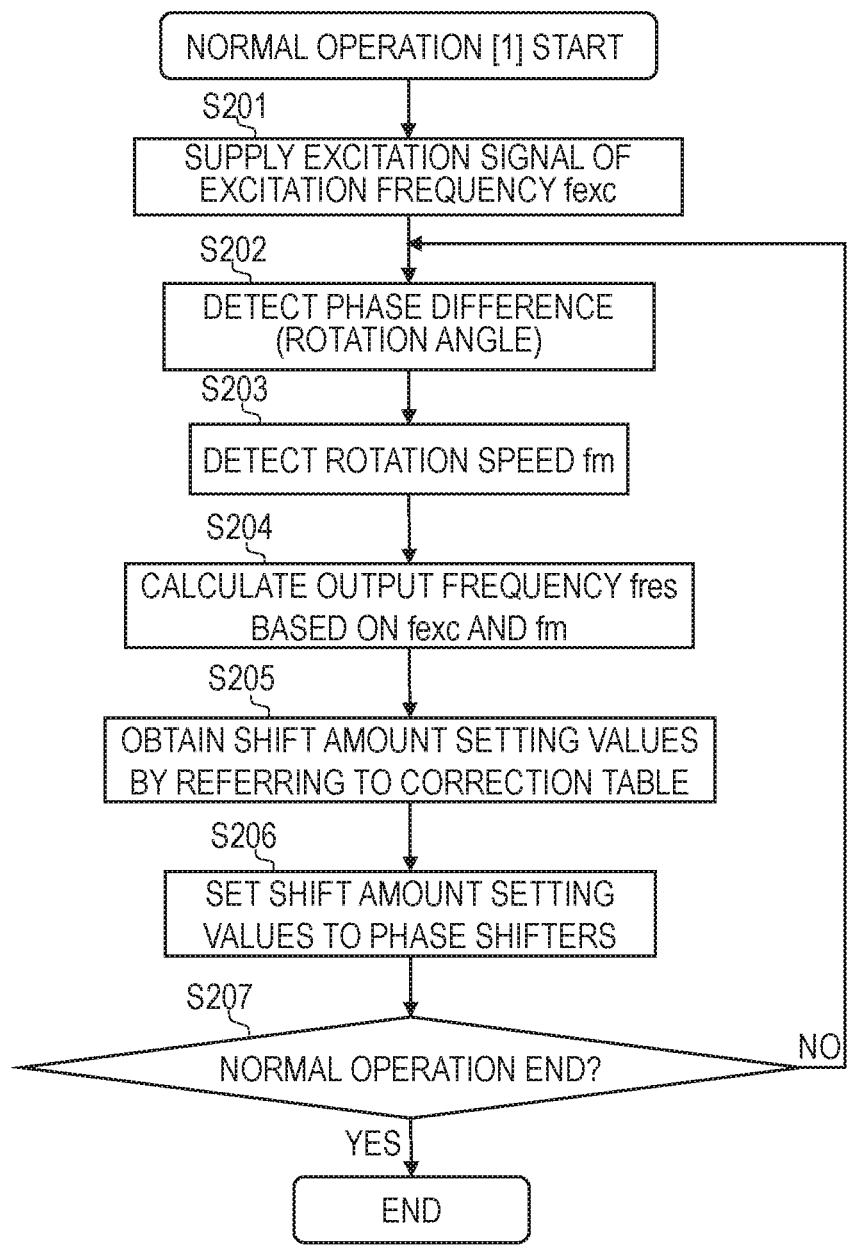
FIG. 5 is a flowchart showing an exemplary process content at the time of normal operation [1] in resolver correction device in FIG. 1.

FIG. 5 is a flowchart showing an exemplary process content at the time of the normal operation [1] in the resolver correction device in FIG. 1. In FIG. 5, the excitation signal supply circuit ESS provides the excitation clock signal CKe (and thus the excitation signal VIN) of the excitation frequency fexc (e.g., 20 kHz) to the resolver RSV via the selection switch SSW (step S201). Subsequently, the phase difference detection circuit PHD (the position detector PDET) detect phase difference between the excitation clock signal CKe and the detection clock signal CKd to detect the rotation angle θ of the resolver RSV (and thus the motor MT) (step S202). The speed detector SDET detect (step S203) the rotation speed (dθ/dt=fm) of the motor MT based on the change rate of the rotation angle θ.

The shift amount correction circuit SCR then uses the excitation frequency fexc, the rotation speed fm detected in the step S203, and the number of poles Np of the resolver RSV, which is determined in advance, to calculate (step S204) the output frequency fres of the detection signals E1, E2 based on the aforementioned equation (1). The shift amount correction circuit SCR obtains the shift amount setting values SS1, SS2 (duty cycle PWMD1, PWMD2) by referring to the correction table CTBLa using the output frequency fres calculated in step S204 as a search key (step S205). The shift amount correction circuit SCR sets the shift amount setting values SS1, SS2 acquired in step S205 to the phase shifters PSF1, PSF2 (step S206).

Here, the resolver correction device repeatedly executes the process of the steps S202 to S206, for example, at every control period of the speed detector SDET while performing the normal operation (step S207). In step S205, the shift amount correction circuit SCR linearly interpolate, for example, the shift amount setting values SS1 and SS2 according to the values of the output frequency fres. Taking the correction table CTBLa in FIG. 3 as an example, if the output frequency fres is 15.5 KHz, the shift amount correction circuit SCR defines duty cycle PWMD1 as "(0.9+0.55)/2" and duty cycle PWMD2 as "(0.8+0.7)/2".

Main Effects of First Embodiment

As described above, by using the resolver correction device of first embodiment, the shift amount setting values SS1, SS2 for each output frequency fres for maintaining the prescribed shift amount (45 degrees, 135 degrees) of the phase shifters PSF1, PSF2 can be acquired in advance at the time of the calibration operation. This allows phase difference between the phase shifters PSF1 and PSF2 to be kept at 90 degrees with high accuracy regardless of the rotation speed fm of the motor MT or the pole count Np of the resolver RSV. Consequently, the detection error of the rotation angle θ (the rotation speed dθ/dt) by the resolver RSV can be reduced, and thus the motor MT can be controlled with high accuracy.

In addition, by using the existing the phase difference detection circuit PHD to turn detect the shift amount of the phase shifters PSF1 and PSF2, the area overhead associated with detecting the shift amount can be reduced. That is, for example, there is no need to provide a dummy phase shifter or the like for detecting the shift amount. In addition, compared with Patent Document 2 system, even when the relationship between the output frequency fres and the correction amount of the shift amount setting value is not proportional but has any characteristics, an appropriate correction amount can be determined. Furthermore, in the normal operation, since it is sufficient to refer to the correction table CTBLa defined at the time of the calibration operation, the control delay associated with the correction can be reduced.

Second Embodiment

<Resolver Correction Device Schematic>

Figure 6A:
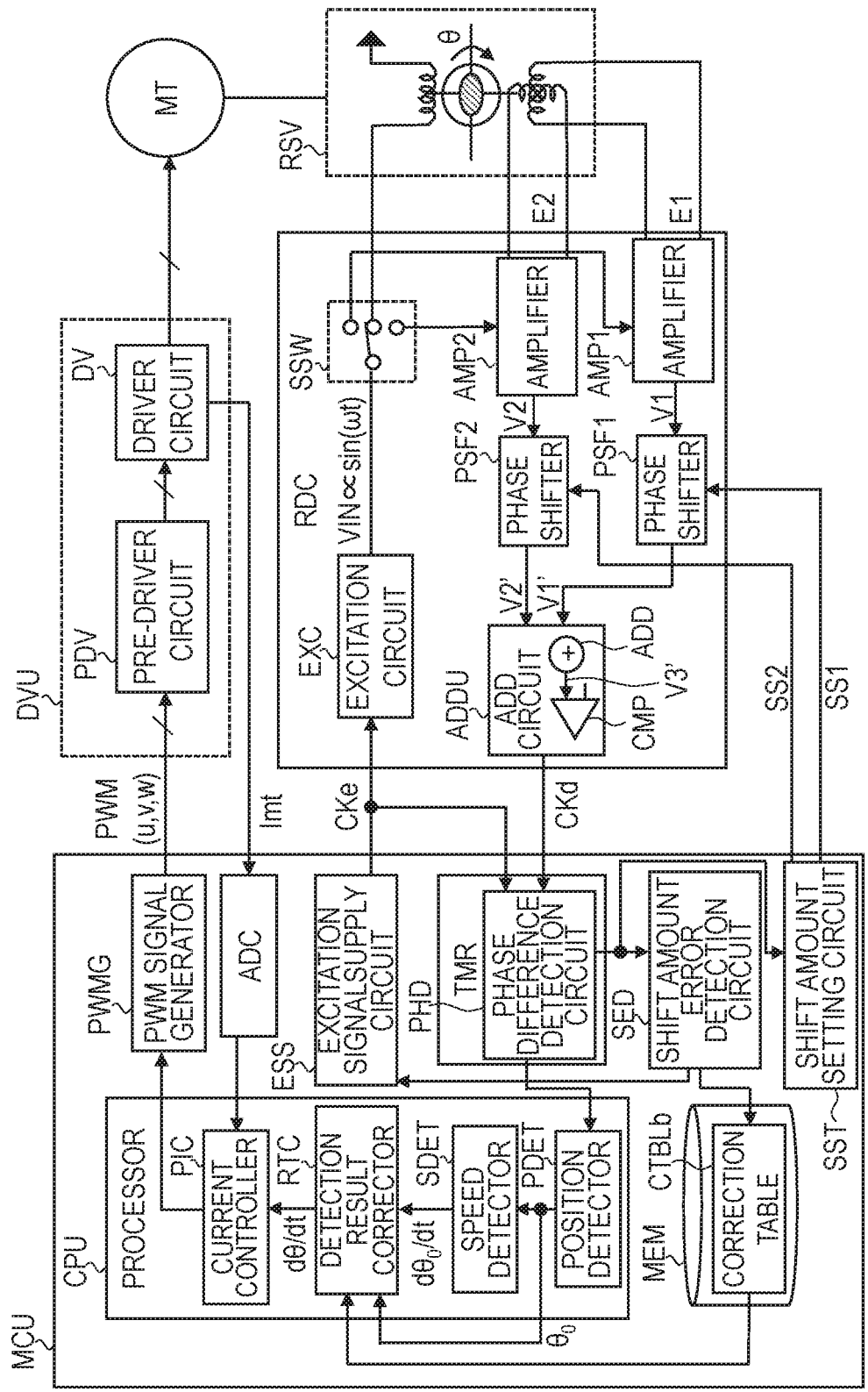
FIG. 6A is a schematic diagram showing a configuration example of a motor system including a resolver correction device according to second embodiment.

FIG. 6A is a schematic diagram showing a configuration example of the motor system including the resolver correction device according to second embodiment. The resolver correction device shown in FIG. 6A comprises a shift amount error detection circuit SED, a shift amount setting circuit SST, a correction table CTBLb and a detection result corrector RTC instead of the shift amount searching circuit SSR, the shift amount correction circuit SCR and the correction table CTBLa in the microcomputer MCU in FIG. 1. The detection result corrector RTC are implemented, for example, by software processing by processor CPU. The shift amount error detection circuit SED and the shift amount setting circuit SST are also implemented, for example, by software-processing by processor CPU. However, these may be other implementations.

In second embodiment method, unlike first embodiment method, the shift amount setting values SS1, SS2 of the phase shifters PSF1, PSF2 are set to fixed values at the time of the normal operation. Instead, a shift amount error from specified amount (e.g., 45 degrees, 135 degrees) in the phase shifters PSF1, PSF2 is detected every output frequency fres at the calibration operation. If the shift amount error for each output frequency fres is known in advance, at the time of the normal operation, it is possible to correct the shift amount error corresponding to the present output frequency fres using arithmetic expression, it is possible to calculate the true rotation angle θ and the rotation speed (dθ/dt).

The shift amount error detection circuit SED detect the shift amount error contained in the shift amount of the phase shifter PSF1 detected in the phase difference detection circuit PHD at every frequency of the excitation signal VINs, with reference to the specified amount (e.g. 45 degrees) at the calibration operation. Similarly, the shift amount error detection circuit SED detect the shift amount error contained in the shift amount of the phase shifter PSF2 detected in the phase difference detection circuit PHD for each frequency of the excitation signal VINs, with reference to specified amount (e.g., 135 degrees).

Correction table CTBLb store the shift amount error of the phase shifters PSF1 and PSF2 for each frequency of the excitation signal VINs detected by the shift amount error detection circuit SED. FIG. 7 is a schematic diagram showing an exemplary configuration of the correction table in FIG. 6A. As shown in FIG. 7, the correction table CTBLb differs from the correction table CTBLa of FIG. 3 by store the shift amount error $\Delta\varphi_0$ and $\Delta\varphi 1$ for each frequency (and thus the output frequency fres) of the excitation signal VINs detected by the shift amount error detection circuit SED. The shift amount error $\Delta\varphi_0$ represents the error produced by the phase shifter PSF1, and the shift amount error $\Delta\varphi 1$ represents the error produced by the phase shifter PSF2.

The shift amount setting circuit SST searches shift amount setting values SS1 and SS2 such that the shift amount of the phase shifters PSF1, PSF2 is the specified amount (45 degrees, 135 degrees) while referring to detection result of the phase difference detection circuit PHD with the excitation signal VIN set to the excitation frequency fexc (for example, 20 kHz) as the initial operation during the calibration operation. The shift amount setting circuit SST sets the shift amount setting values SS1, SS2, which is the search result, to the phase shifters PSF1, PSF2 at the time of the calibration operation and at the time of the normal operation.

The detection result corrector RTC corrects the rotation angle of the resolver RSV detected by the phase difference detection circuit PHD based on the retained content of the correction table CTBLb and the predetermined arithmetic expression at the normal operation. Specifically, the detection result corrector RTC first calculate the output frequency fres of the detection signals E1 and E2 based on the rotation speed (apparent the rotation speed ($d\theta_0/dt=fm$)) detected in the speed detector SDET and the excitation frequency fexc of the excitation signal VIN and the number of poles Np of the resolver RSV.

Subsequently, the detection result corrector RTC obtains the shift amount error $\Delta\varphi_0$ and $\Delta\varphi_1$ of the phase shifters PSF1 and PSF2 by referring to the correction table CTBLb using the output frequency fres as search keys. The detection result corrector RTC corrects the rotation angle of the resolver RSV based on arithmetic expression using the rotation angle (apparent the rotation angle $\theta_0$) of the resolver RSV detected by the shift amount error $\Delta\varphi_0$, $\Delta\varphi_1$, and the phase difference detection circuit PHD (the position detector PDET) as parameters, and calculate the true rotation angle $\theta$. The current controller PIC determines duty cycle based on a true rotation speed ($d\theta/dt$) obtained from the true rotation angle $\theta$, and instructs the PWM signal generator PWMG.

Figure 6B:
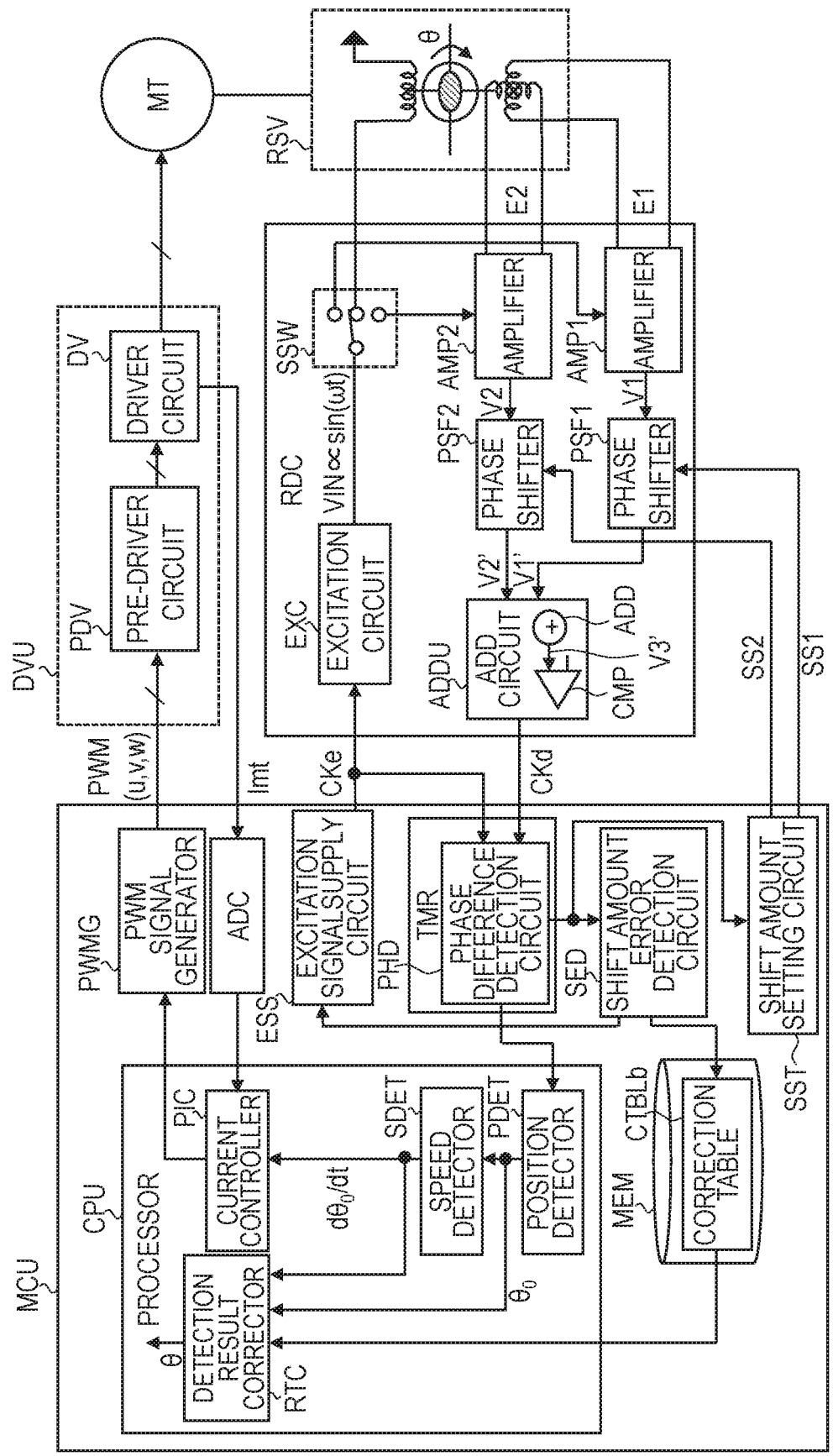
FIG. 6B is a schematic diagram showing modified example in FIG. 6A.

FIG. 6B is a schematic diagram showing modified example of FIG. 6A. In the configuration of the diagram 6A, the current controller PIC determined duty cycle based on the true rotation speed ($d\theta/dt$) obtained from the true rotation angle $\theta$, was instructed to the PWM signal generator PWMG. However, since the error of the rotation speed ($d\theta/dt$) is much smaller than the error of rotation angle $\theta$, the current controller PIC may determine duty cycle based on the pre-correction apparent rotation speed ($d\theta_0/dt$), as shown in FIG. 6B. In this case, since calculate number of the rotation speed from the rotation angle requires only one time, it is possible to reduce the calculation load on the control. Incidentally, in FIG. 6B (the same applies to FIG. 6A), the true rotation angle $\theta$ calculated by the detection result corrector RTC is used, for example, as position information or the like associated with the vector control of the motor MT.

<Arithmetic Expression for Correcting Shift Amount Error>

Figure 8:
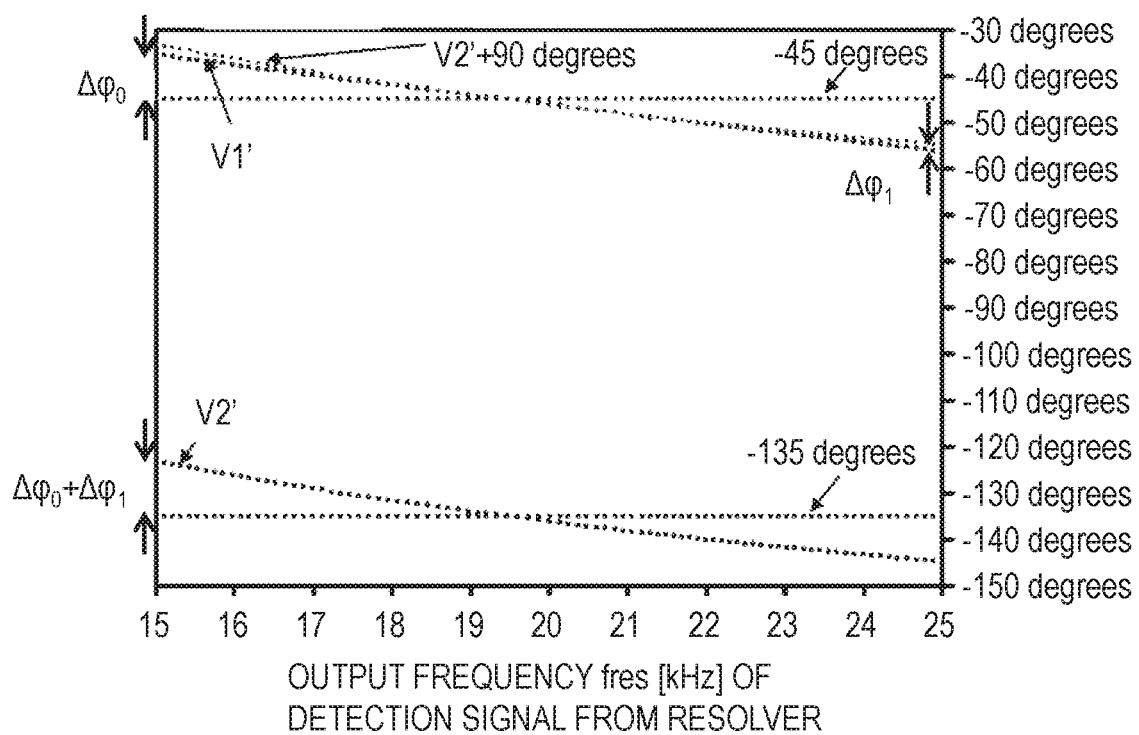
FIG. 8 is a diagram for explaining arithmetic expression used in a detection result corrector in FIG. 6A.

FIG. 8 is a diagram for explaining arithmetic expression used in the detection result corrector in FIG. 6A. First, the phase signals V1 and V2 obtained from detection result of the resolver RSV are expressed by equation (2) and equation (3) using: the true rotation angle (electric angle) $\theta$ of the resolver RSV, and frequency modulated angular velocity $\omega$ ($=\omega_0+\omega_m$) accompanying the revolution of the resolver RSV. "$\omega_0$" is the angular velocity based on the excitation frequency fexc, and "$\omega_m$" is the angular velocity (electric angle) of the resolver RSV.

$$V1=\sin\theta\times\sin\omega t: \qquad \text{equation (2)}$$

$$V2=\cos\theta\times\sin\omega t: \qquad \text{equation (3)}$$

Let us now assume that the phase shifters PSF1, PSF2 shifts the phase signal V1 by 45 degrees ($=\pi/4$) and the phase signal V2 by 135 degrees ($=3\pi/4$). At this time, as shown in FIG. 8, the shift amount error generated on the phase signal V1 side is defined as $\Delta\varphi_0$, and the shift amount error generated on the phase signal V2 side is defined as "$\Delta\varphi_0+\Delta\varphi_1$". The phase signal V1' after shifting of the phase signal V1 is given by equation (4). On the other hand, the phase signal V2' after shifting of the phase signal V2 is expressed by equation (5), and when the approximate expressions of "$\cos\Delta\varphi_1=1-\Delta\varphi_1^2/2$" and "$\sin\Delta\varphi_1=\Delta\varphi_1$" on the assumption that the $\Delta\varphi1$ is sufficiently small are used, equation (6) is obtained.

$$V1' = \sin\theta\times\sin(\omega t+\pi/4+\Delta\varphi_0): \qquad \text{equation (4)}$$

$$\begin{aligned}V2' &= \cos\theta\times\sin(\omega t+3\pi/4+\Delta\varphi_0+\Delta\varphi_1):\\ &= \cos\theta\{\cos(\omega t+\pi/4+\Delta\varphi_0)\times\cos\Delta\varphi_1 -\\ &\quad \sin(\omega t+\pi/4+\Delta\varphi_0)\times\sin\Delta\varphi_1\}\end{aligned} \qquad \text{equation (5)}$$

$$\approx \cos\theta\{\cos(\omega t+\pi/4+\Delta\varphi_0)\times(1-\Delta\varphi_1^2/2) - \sin(\omega t+\pi/4+\Delta\varphi_0)\times\Delta\varphi_1\}: \qquad \text{equation (6)}$$

Add circuit ADDU outputs the phase signal V3'($=$V1'$+$V2') of the equation (7) by adding the phase signal V1' of the equation (4) and the phase signal V2' of the equation (6).

$$V3'=\sin\theta\sin(\omega t+\pi/4+\Delta\varphi_0)+\cos\theta\{\cos(\omega t+\pi/4+\Delta\varphi_0)\times(1-\Delta\varphi_1^2/2)-\sin(\omega t+\pi/4+\Delta\varphi_0)\times\Delta\varphi_1\}=\cos((\omega t+\pi/4+\Delta\varphi_0)-\theta)-\cos\theta(\Delta\varphi_1^2/2+\sin(\omega t+\pi/4+\Delta\varphi_0)\times\Delta\varphi_1): \qquad \text{equation (7)}$$

Add circuit ADDU converts the phase signal V3' of the equation (7) into a rectangular wave (the detection clock signal CKd) by using the comparator CMP. At this time, since the comparator CMP detects phase at the midpoint (amplitude center) of the phase signal V3', the comparator CMP detects phase as "$\omega t=\pi/4-\Delta\varphi_0+\theta$" which satisfies "$\cos((\omega t+\pi/4+\Delta\varphi_0)-\theta)=0$". The error $\Delta V3'$ of the phase signal V3' at the time of detecting phase is expressed by equation (8).

$$\begin{aligned}\Delta V3' &= -\cos\theta(\Delta\varphi_1^2/2+\sin(\omega t+\pi/4+\Delta\varphi_0)\times\Delta\varphi_1)\\ &= -\cos\theta(\Delta\varphi_1^2/2+\sin(\pi/2+\theta)\times\Delta\varphi_1)\\ &= \cos\theta\times\Delta\varphi_1\times(\Delta\varphi_1/2+\cos\theta):\end{aligned} \qquad \text{equation (8)}$$

When the comparator CMP detects phase ("$\omega t=\pi/4-\Delta\varphi_0+\theta$") by the comparator CMP, the temporal derivative of the phase signal V3' of the equation (7) becomes "$d(V3')/dt=-\omega(1-\Delta\varphi_1\times\cos\theta\sin\theta)\approx-\omega$". Therefore, the time conversion error $\Delta t$ at the time of detecting phase by the comparator CMP becomes equation (9) using equation (8).

$$\begin{aligned}\Delta t &= \Delta V3'/\{d(V3')/dt\}\\ &= -\cos\theta\times\Delta\varphi_1\times(\Delta\varphi_1/2+\cos\theta)/\omega:\end{aligned} \qquad \text{equation (9)}$$

As f($=\omega/2\pi$) frequency after frequency modulation, when converting the time conversion error $\Delta t$ of equation (9) to the electrical angle conversion error $\Delta\theta$, the electrical angle conversion error $\Delta\theta$ at the time of detecting phase by the comparator CMP is equation (10).

$$\Delta\theta=2\pi\times\Delta t/(1/f)=-\Delta\varphi_1\cos\theta(\Delta\varphi_1/2+\cos\theta): \qquad \text{equation (10)}$$

On the other hand, the phase difference detection circuit PHD is detect as the apparent rotation angle $\theta_0$ obtained by adding the electric angle conversion error $\Delta\theta$ to phase "$\omega t=\pi/4-\Delta\varphi_0+\theta$" detected by the comparator CMP. Therefore, the true rotation angle $\theta$ is obtained by equation (11).

$$\theta=\theta_0-\pi/4-\Delta\varphi_0-\Delta\theta: \qquad \text{equation (11)}$$

Based on equation (10) and equation (11), the final electric angle conversion error $\Delta\theta$ becomes equation (12), the true rotation angle $\theta$ becomes equation (13).

$$\Delta\theta = -\Delta\varphi_1 \cos(\theta_0 - \pi/4 + \Delta\varphi_0)(\Delta\varphi_1/2 + \cos(\theta_0 - \pi/4 + \Delta\varphi_0)): \quad \text{equation (12)}$$

$$\theta = \theta_0 - \pi/4 - \Delta\varphi_0 + \Delta\varphi_1 \cos(\theta_0 - \pi/4 + \Delta\varphi_0)(\Delta\varphi_1/2 + \cos(\theta_0 - \pi/4 + \Delta\varphi_0)): \quad \text{equation (13)}$$

As shown in equation (13), the true rotation angle $\theta$ can be calculated based on the apparent rotation angle $\theta_0$ of the resolver RSV detected by the phase difference detection circuit PHD (the position detector PDET) and the shift amount error $\Delta\varphi_0$ and $\theta\varphi_1$ of the phase shifters PSF1 and PSF2 occurring at the time of the detection. The detection result corrector RTC obtains the shift amount error $\Delta\varphi_0$ and $\Delta\varphi_1$ corresponding to the present output frequency fres from the correction table CTBLb, thereby calculating the true rotation angle $\theta$ based on equation (13).

<Resolver Correction Device Operation>

Figure 9:
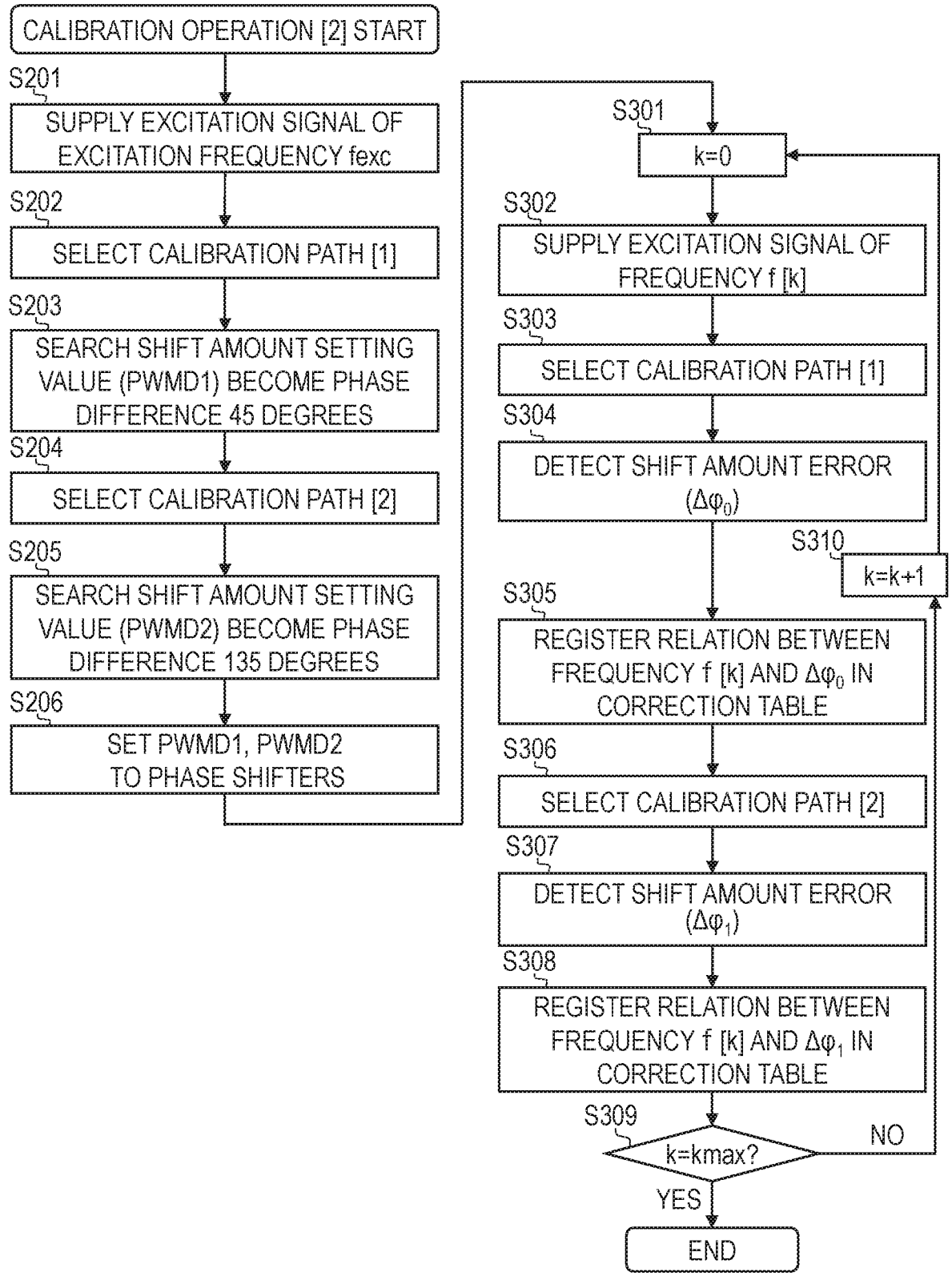
FIG. 9 is a flowchart illustrating an example of the processing content at the time of calibration operation [2] in resolver correction device in FIG. 6A.

FIG. 9 is a flowchart illustrating an exemplary process performed at the calibration operation [2] in the resolver correction device in FIG. 6A. In the steps S201 to S206 shown in FIG. 9, the initial operation that is the premise of the calibration operation is performed, and in the subsequent steps S301 to S310, the calibration operation for generating the correction table CTBLb is performed. In step S201, the excitation signal supply circuit ESS provides the excitation clock signal CKe (and thus the excitation signal VIN) of the excitation frequency fexc (e.g., 20 kHz).

Subsequently, the selection switch SSW selects a calibration path [1] (a path to the phase shifter PSF1) in response to an instruction from the shift amount setting circuit SST (step S202). Then, the shift amount setting circuit SST search the shift amount setting value SS1 in which the shift amount detected by the phase difference detection circuit PHD becomes the specified amount (here, 45 degrees) while sequentially changing the shift amount setting value SS1 (duty cycle PWMD1).

The calibration path [2] (path to the phase shifter PSF2) is then subjected to the same process as for steps S202, S203. Specifically, the selection switch SSW selects the calibration pass [2] (step S204), and the shift amount setting circuit SST searches (step S205) the shift amount setting value SS2 (duty cycle PWMD2) in which the shift amount detected by the phase difference detection circuit PHD is specified amount (here, 135 degrees). The shift amount setting circuit SST sets the shift amount setting values SS1, SS2 (PWMD1, PWMD2), which is the search result of steps S203, S205, to the phase shifters PSF1, PSF2 (step S206).

Subsequently, the excitation signal supply circuit ESS, in response to an instruction from the shift amount error detection circuit SED, (step S301) as k=0, the excitation clock signal CKe of frequency f [k] (and thus the excitation signal VIN) (step S302). The selection switch SSW then selects the calibration path [1] according to the instructions from the shift amount error detection circuit SED (step S303). The shift amount error detection circuit SED detect (step S304) the shift amount error $\Delta\varphi_0$ (i.e. error with 45 degrees) based on detection result of the phase difference detection circuit PHD. The shift amount error detection circuit SED registers the corresponding relation between frequency f [k] of the step S302 and the shift amount error $\Delta\varphi_0$ which is detection result of the step S304 in the correction table CTBLb, in step S305.

Next, in the steps S306 to S308, the same process as in the steps S303 to S305 is performed for the calibration pass [2].

The selection switch SSW selects the calibration pass [2] (step S306) and the shift amount error detection circuit SED detects the shift amount error $\Delta\varphi_1$ through detecting the shift amount error "$\Delta\varphi_0 + \Delta\varphi_1$" (i.e. the error with 135 degrees) (step S307). Then, the shift amount error detection circuit SED registers the correspondence between frequency f [k] and the shift amount error $\Delta\varphi_1$ in the correction table CTBLb (step S308).

Thereafter, the shift amount error detection circuit SED repeat the process of the steps S302 to S308 until k=kmax while sequentially changing k (steps S309, S310). As a result, in the correction table CTBLb in FIG. 7, frequency f [k] of the step S302 is changed in 1 kHz increments from 15 kHz to 25 kHz, and the shift amount error $\Delta\varphi_0$ and $\Delta\varphi_1$ for each frequency f [k] are registered.

Figure 10:
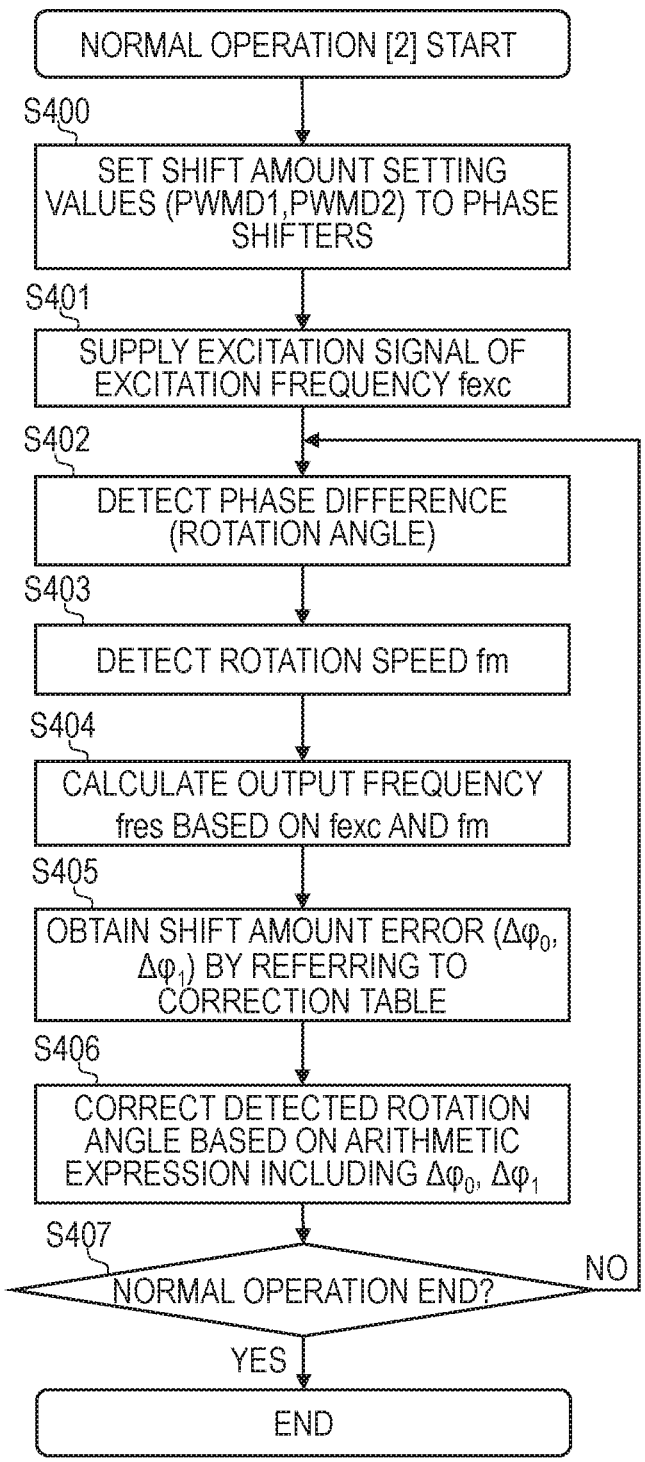
FIG. 10 is a flowchart illustrating an example of the processing content at the time of normal operation [2] in resolver correction device in FIG. 6A.

FIG. 10 is a flowchart illustrating an exemplary process content at the time of the normal operation [2] in the resolver correction device in FIG. 6A. In FIG. 10, the shift amount setting circuit SST sets the shift amount setting values SS1, SS2 (PWMD1, PWMD2), which is search result of the steps S203, S205 in FIG. 9, in the phase shifters PSF1, PSF2 (step S400). Excitation signal supply circuit ESS also provides the excitation clock signal CKe (and thus the excitation signal VIN) of the excitation frequency fexc (e.g., 20 kHz) to the resolver RSV via the selection switch SSW (step S401).

Subsequently, in steps S402 to S404, as in steps S202 to S204 of FIG. 5, the phase difference detection circuit PHD (the position detector PDET) detects the apparent rotation angle $\theta_0$ of the resolver RSV (and thus the motor MT), and the speed detector SDET detect the apparent rotation speed of the motor MT ($d\theta_0/dt = fm$). The detection result corrector RTC then calculate (step S404) the output frequency fres based on the aforementioned equation (1) using the excitation frequency fexc, the rotation speed fm detected in the step S403, and the number of poles Np of the resolver RSV, which is determined in advance.

Subsequently, the detection result corrector RTC obtains the shift amount error $\Delta\varphi_0$ and $\Delta\varphi_1$ by referring to the correction table CTBLb using the output frequency fres calculated in step S404 as search keys (step S405). The detection result corrector RTC performs correction based on equation (13) using the shift amount error $\Delta\varphi_0$ and $\Delta\varphi_1$ obtained by Step S405, and the apparent rotation angle $\theta_0$ detected by Step S402 to calculate the true rotation angle $\theta$ (and thus the true rotation speed $d\theta/dt$) (Step S406).

Then, the resolver correction device, while performing the normal operation, the process of the steps S402 to S406, for example, repeatedly executes at each control period of the speed detector SDET (step S407). In step S405, the detection result corrector RTC appropriately linearly interpolate the shift amount error $\Delta\varphi_0$ and $\Delta\varphi_1$ in accordance with the values of the output frequency fres, as in step S205 in FIG. 5.

Second Embodiment's Main Effect

Figure 11:
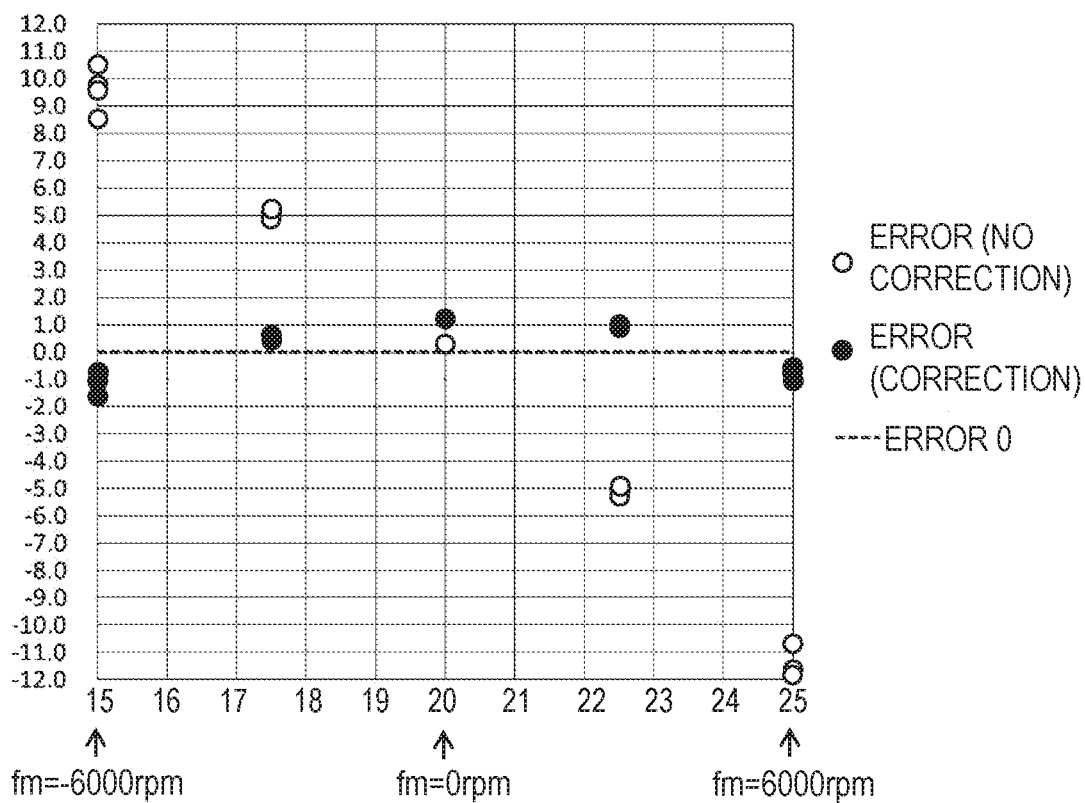
FIG. 11 is a diagram showing an example of a simulation result of comparing the detection error of a rotation angle of motor with and without the correction using resolver correction device in FIG. 6A.

Use second embodiment's the resolver correction device to achieve the same effect as first embodiment. In particular, the detection error of the rotation angle $\theta$ (the rotation speed $d\theta/dt$) by the resolver RSV can be reduced, thus enabling high-precision control of the motor MT. FIG. 11 is a diagram illustrating an example of a simulation result in which the detection error of the rotation angle of the motor is compared between the case in which correction is performed using the resolver correction device in FIG. 6A and the case in which correction is not performed. Here, the excitation frequency fexc is assumed to be 20 kHz, and the number of poles Np of the resolver RSV is assumed to be 50 poles.

As shown in FIG. 11, for example, when the rotation speed of the motor MT is in the range of 0 rpm to ±3000 rpm and correction is not performed, a detection error of about −5.3 degrees to +5.3 degrees may occur, but by performing correction, the detection error can be reduced to about +0.3 degrees to +1.2 degrees. When the rotation speed of the motor MT is 0 rpm to ±6000 rpm and the MT is not corrected, a detection error of about −11.8 degrees to +10.5 degrees may occur. However, the detection error can be reduced to about −1.6 degrees to +1.2 degrees by correcting the MT.

Further, as compared with first embodiment method, since it is not necessary to variably control the shift amount setting values SS1, SS2 (duty cycle PWMD1, PWMD2) at the time of the normal operation, for example, it is not necessary to consider the effect of the switching timing or the like accompanying the variable control. Further, in first embodiment method, the detection error depends on, for example, the set resolution of duty cycles PWMD1, PWMD2, and the like, but in second embodiment method, such dependence does not easily occur.

Third Embodiment

<Outline of Resolver Correction Device>

Figure 12A:
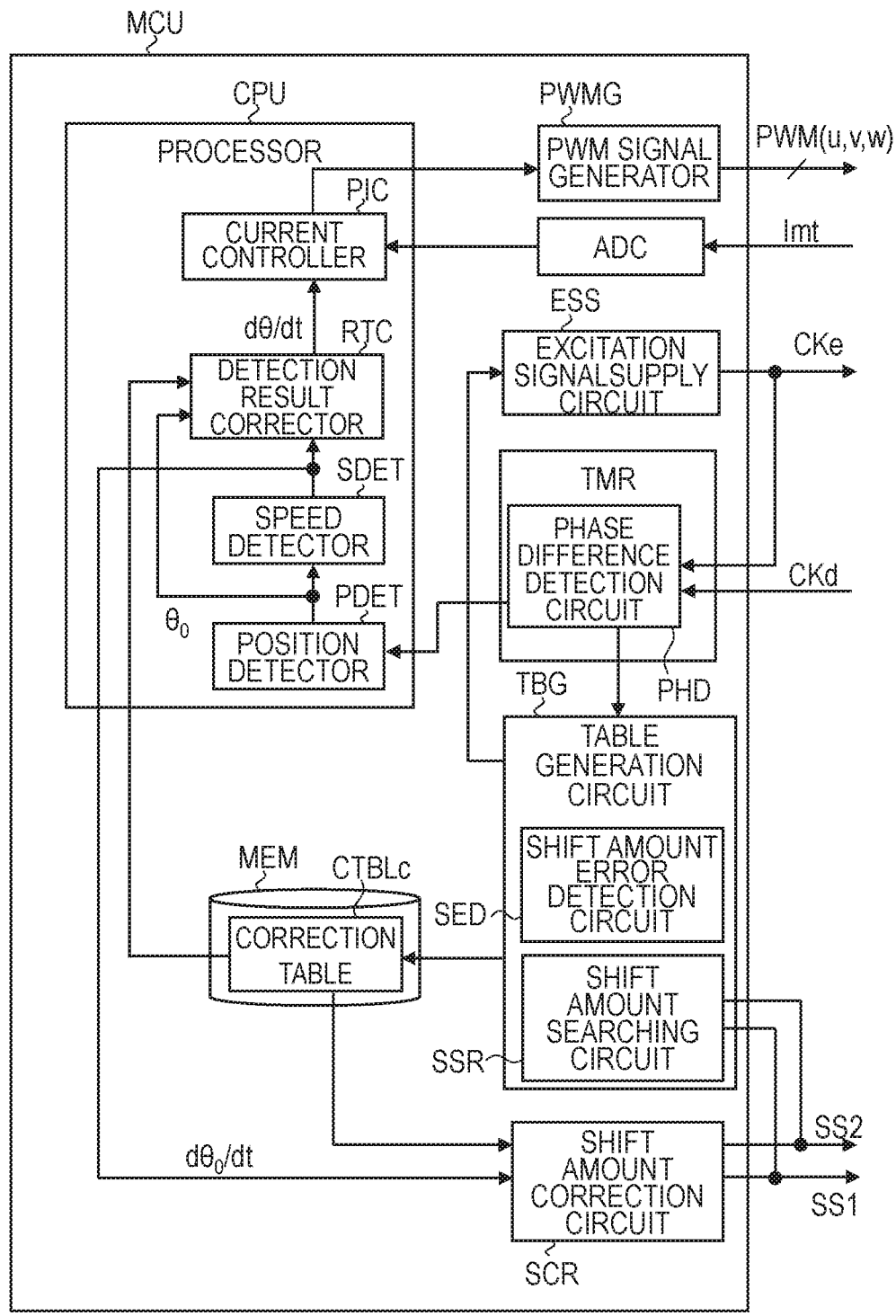
FIG. 12A is a schematic diagram showing a configuration example of a microcomputer in resolver correction device according to third embodiment.

FIG. 12A is a schematic diagram showing an exemplary configuration of the microcomputer in the resolver correction device according to the present third embodiment. Third embodiment method is a combination of first embodiment scheme and second embodiment scheme. In second embodiment method, the shift amount setting values SS1 and SS2 of the phase shifters PSF1 and PSF2 are fixed values, but in third embodiment method, they are variably controlled in the same manner as in first embodiment method. However, strictly speaking, the shift amount error remains in shift amount of the phase shifters PSF1 and PSF2 in accordance with the set resolution of the shift amount setting values SS1 and SS2 (duty cycle PWMD1 and PWMD2). Third embodiment method corrects the residual error using second embodiment method.

The microcomputer MCU shown in FIG. 12A includes a table generation circuit TBG including the shift amount searching circuit SSR shown in FIG. 1 and the shift amount error detection circuit SED shown in FIG. 6A, the shift amount correction circuit SCR shown in FIG. 1, the detection result corrector RTC shown in FIG. 6A, and a correction table CTBLc. As described in first embodiment, the shift amount searching circuit SSR searches for the shift amount setting values SS1 and SS2 of each frequency of the excitation signal VINs and registers the searched the shift amount setting values SS1 and SS2 in the correction table CTBLc at the time of calibration operation.

The shift amount error detection circuit SED reflects the shift amount setting values SS1 and SS2, which are search result of the shift amount searching circuit SSR, and then detects the shift amount errors $\Delta\varphi_0$ and $\Delta\varphi_1$ remaining in shift amount of the phase shifters PSF1 and PSF2 detected by the phase difference detection circuit PHD for each frequency of the excitation signals VIN at the time of the calibration operation. Then, the shift amount error detection circuit SED registers the shift amount errors $\Delta\varphi_0$, $\Delta\varphi_1$ for each frequency of the excitation signals VIN to the correction table CTBLc.

FIG. 13 is a schematic diagram showing an exemplary configuration of the correction table in FIG. 12A. As shown in FIG. 13, the correction table CTBLc has a configuration in which the correction table CTBLa of FIG. 3 and the correction table CTBLb of FIG. 7 are combined. Correction table CTBLc stores the shift amount setting values SS1, SS2 (duty cycles PWMD1, PWMD2) and the shift amount errors $\Delta\varphi_0$, $\Delta\varphi_1$ for each frequency (and thus the output frequency fres) of the excitation signals VINs.

The shift amount correction circuit calculates the output frequency fres based on the rotation speed and the like detected by the speed detector SDET, and obtains the corresponding duty cycles PWMD1 and PWMD2 from the correction table CTBLc and sets them in the phase shifters PSF1, PSF2 at the time of the normal operation, as in the case of first embodiment. The detection result corrector RTC calculates the output frequency fres on the basis of the rotation speed (apparent rotation speed $(d\theta_0/dt)$) and the like detected by the speed detector SDET and acquires the corresponding shift amount error $\Delta\varphi_0$ and $\Delta\varphi_1$ from the correction table CTBLc at the time of passing the normal operation in the same manner as second embodiment RTC. The detection result corrector RTC corrects the rotation angle based on arithmetic expression of equation (13) using the shift amount error $\Delta\varphi_0$, $\Delta\varphi_1$ and the rotation angle (apparent rotation angle $\theta_0$) detected by the phase difference detection circuit PHD (the position detector PDET) to calculate the true rotation angle $\theta$ (and thus the true rotation speed $(d\theta/dt)$).

Figure 12B:
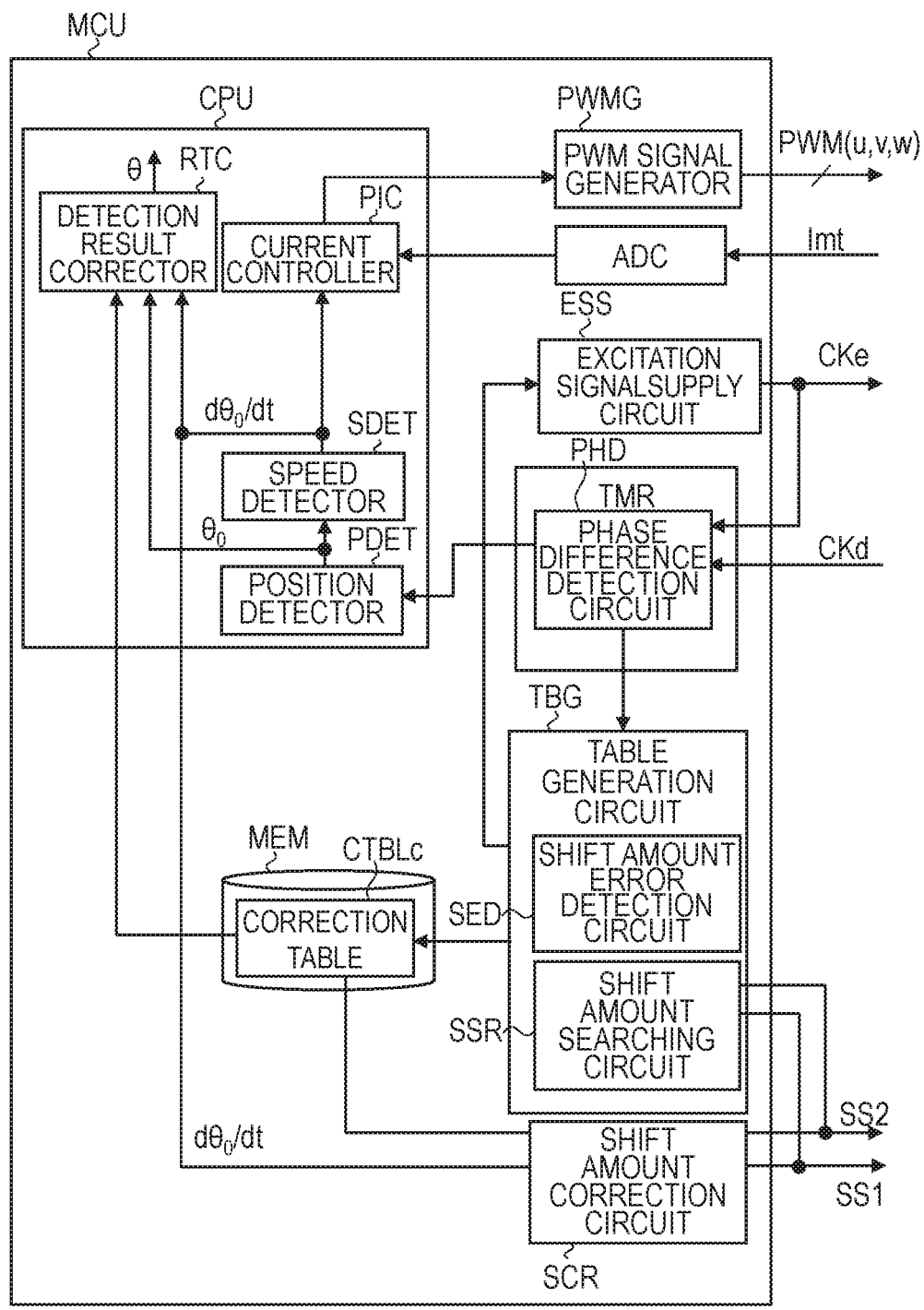
FIG. 12B is a schematic diagram showing modified example of FIG. 12A.

FIG. 12B is a schematic diagram showing modified example of FIG. 12A. In the configuration example of FIG. 12B, unlike the configuration example of FIG. 12A, the current controller PIC defines duty cycle based on the apparent rotation speed $(d\theta_0/dt)$ prior to correction, as in the case of the above-described FIG. 6B. This reduces the computational burden on the control because the rotation speed from the rotation angle requires only one calculate.

<Resolver Correction Device Operation>

Figure 14:
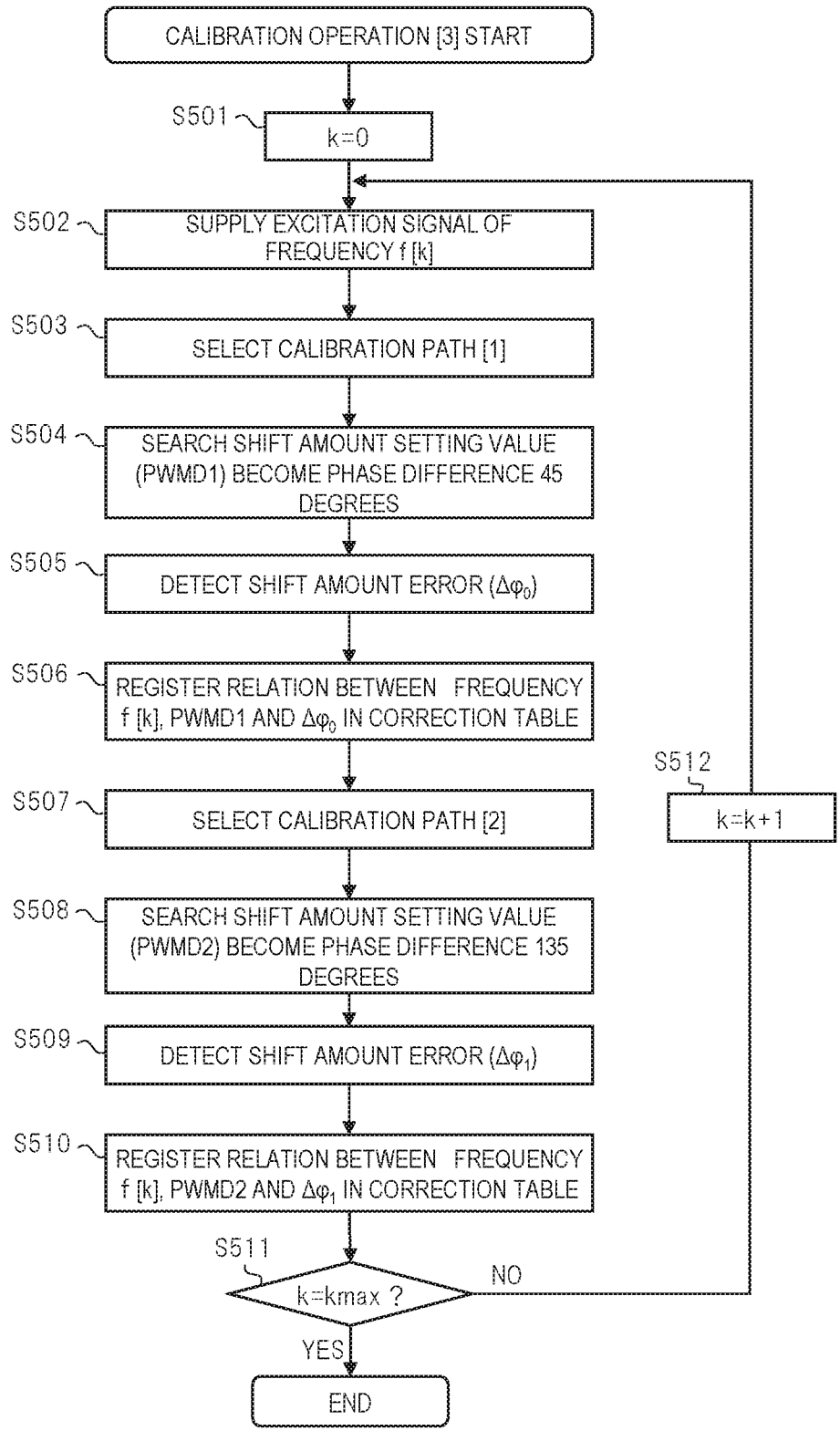
FIG. 14 is a flowchart showing an exemplary process content at the time of calibration operation [3] in resolver correction device of FIG. 12A.

FIG. 14 is a flowchart illustrating an exemplary process performed at the calibration operation [3] in the resolver correction device in FIG. 12A. In FIG. 14, the excitation signal supply circuit ESS supplies the excitation clock signal CKe (and thus the excitation signal VIN) of frequency f [k] as k=0 (step S501) in response to an instruction from the shift amount searching circuit SSR (step S502). Subsequently, the selection switch SSW selects a calibration path [1] (a path to the phase shifter PSF1) in response to an instruction from the shift amount searching circuit SSR (step S503).

Next, the shift amount searching circuit SSR search the shift amount setting value SS1 in which shift amount detected by the phase difference detection circuit PHD becomes the specified amount (here, 45 degrees) while sequentially changing the shift amount setting value SS1 (duty cycle PWMD1) (S504). The shift amount searching circuit SSR sets the shift amount setting value SS1, which is the search result, to the phase shifter PSF1.

In this condition, the shift amount error detection circuit SED detect the shift amount error $\Delta\varphi_0$ of the phase shifter PSF1 (i.e., the error from 45 degrees) based on detection result of the phase difference detection circuit PHD (S505 step). The table generation circuit TBG registers the correspondence among frequency f [k] of the step S502, the shift amount setting value SS1 (duty cycle PWMD1), which is the search result of the step S504, and the shift amount error $\Delta\varphi_0$, which is detection result of the step S505, in the correction table CTBLc (step S506).

Subsequently, in the steps S507 to S510, the same process as in the steps S503 to S506 is performed for the calibration path [2] (the path to the phase shifter PSF2). That is, the selection switch SSW selects the calibration pass [2] (step S507), and the shift amount searching circuit SSR search (step S508) the shift amount setting value SS2 (duty cycle PWMD2) in which shift amount detected by the phase difference detection circuit PHD becomes the specified amount (here, 135 degrees).

With this search result reflected, the shift amount error detection circuit SED detect the shift amount error $\Delta\varphi_2$ (step S509) through the detection of the shift amount error of the phase shifter PSF2 "the shift amount error" of the phase shifter PSF2 "$\Delta\varphi_0+\Delta\varphi_1$" (i.e., an error of 135 degrees) based on detection result of the phase difference detection circuit PHD. Then, the table generation circuit TBG registers the corresponding relation among frequency f [k] of the step S502, the shift amount setting value SS2 (duty cycle PWMD2) which is the search result of the step S508, and the shift amount error $\Delta\varphi_1$ which is detection result of the step S509 in the correction table CTBLc (step S510).

Thereafter, the shift amount searching circuit SSR repeats the process of the steps S502 to S510 until k=kmax while sequentially changing k (steps S511, S512). As a result, the correction table CTBLc as shown in FIG. 13 is generated.

Figure 15:
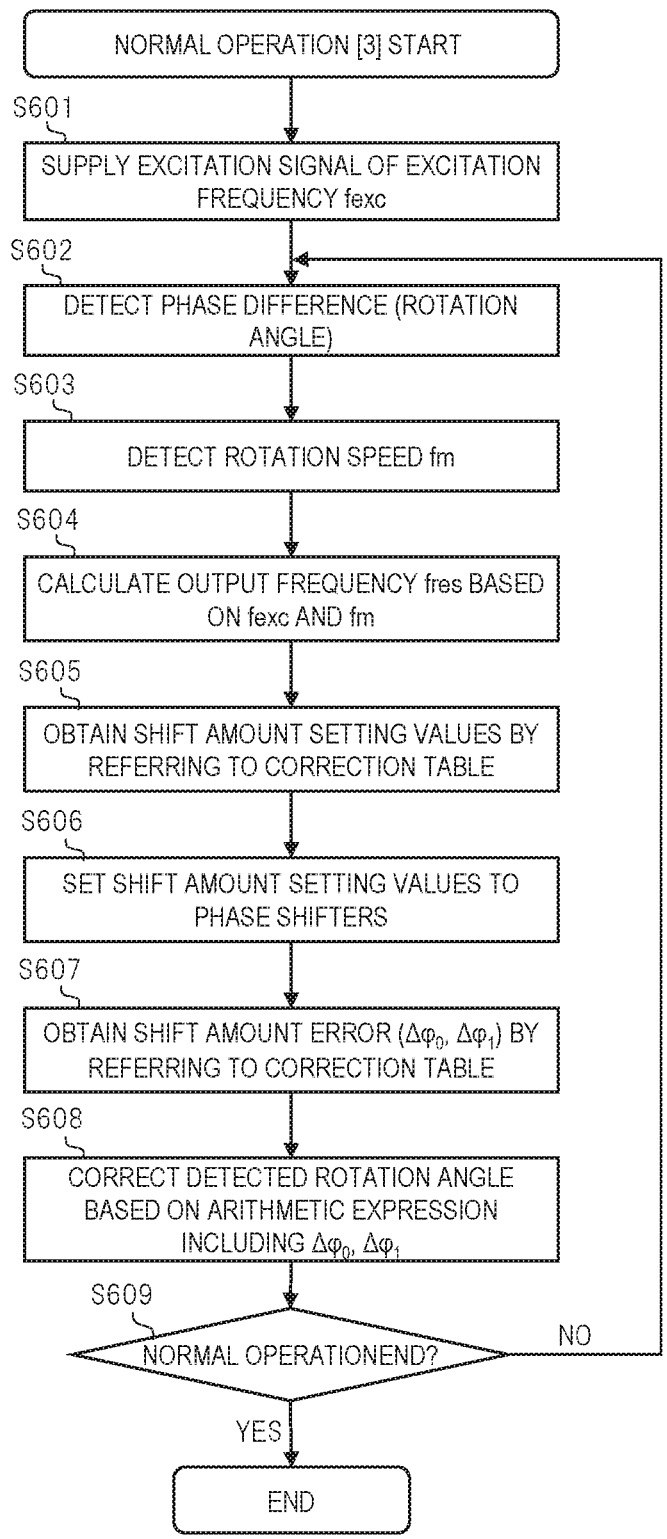
FIG. 15 is a flowchart showing an exemplary process content at the time of normal operation [3] in resolver correction device of FIG. 12A.

FIG. 15 is a flowchart showing an exemplary process content at the time of the normal operation [3] in the resolver correction device in FIG. 12A. In FIG. 15, the excitation signal supply circuit ESS provides the excitation clock signal CKe (and thus the excitation signal VIN) of the excitation frequency fexc (e.g., 20 kHz) to the resolver RSV via the selection switch SSW (step S601).

Subsequently, in steps S602 to S604, as in steps S202 to S204 of FIG. 5, the phase difference detection circuit PHD (the position detector PDET) detects the apparent rotation angle $\theta_0$ of the resolver RSV, and thus the motor MT, and the speed detector SDET detect the apparent rotation speed of the motor MT ($d\theta_0/dt=fm$). The shift amount correction circuit SCR and the detection result corrector RTC then calculate (step S604) the output frequency fres based on the aforementioned equation (1) using the excitation frequency fexc, the rotation speed fm detected in the step S603, and the number of poles Np of the resolver RSV, which is determined in advance.

Subsequently, the shift amount correction circuit SCR obtains the shift amount setting values SS1, SS2 (duty cycles PWMD1, PWMD2) corresponding to the calculated output frequency fres from the correction table CTBLc (step S605), and sets the phase shifters PSF1, PSF2 (step S606). The detection result corrector RTC obtains the shift amount errors $\Delta\varphi_0$ and $\Delta\varphi_1$ corresponding to the calculated output frequency fres from the correction table CTBLc (step S607). Then, the detection result corrector RTC performs correction based on the equation (13) using the obtained shift amount errors $\Delta\varphi_0$ and $\Delta\varphi_1$ and the apparent rotation angle $\theta_0$ detected in the step S602, and calculates (step S608) the true rotation angle $\theta$ (and thus the true rotation speed $d\theta/dt$).

Then, the resolver correction device, while performing the normal operation, the process of the steps S602 to S608, for example, repeatedly executed at each control period of the speed detector SDET (step S609). In step S605, in detail, the shift amount correction circuit SCR linearly interpolate the shift amount setting values SS1 and SS2 according to the values of the output frequency fres. Similarly, in step S607, the detection result corrector RTC linearly interpolate the shift amount error $\Delta\varphi_0$ and $\Delta\varphi_1$ as appropriate, in particular depending on the values of the output frequency fres.

Third Embodiment's Main Effect

The use of third embodiment's the resolver correction device produces the same effect as first and second embodiments. In addition, compared with the cases of first and second embodiments, the detection error of the rotation angle $\theta$ (the rotation speed $d\theta/dt$) by the resolver RSV can be further reduced, thus enabling the motor MT to be controlled with higher precision. Specifically, for first embodiment method, as described above, in order to reduce the detection error, it is necessary to increase the setting resolution of duty cycle (and thus the clock frequency) associated with the shift amount setting value.

On the other hand, in second embodiment system, for example, in the above-described equation (6), the correction error increases when the shift amount error $\Delta\varphi_1$ increases because the approximate expression of "sin $\Delta\varphi_1=\Delta\varphi_1$" is used on the assumption that it is sufficiently small. As a specific example, when the shift amount error $\Delta\varphi_1$ is about 20 degrees is sin($\Delta\varphi_1$)=0.349 $\Delta\varphi_1$ with respect to 0.342, approximate error of about 2% occurs.

Therefore, by combining first embodiment method with second embodiment method, it is possible to reduce the shift amount error $\theta\varphi_1$ to, for example, 5 degrees or less. In this case, for sin($\Delta\varphi_1$)=0.0871 is $\Delta\varphi_1$=0.0872, the approximate error can be suppressed to about 0.1%. In another aspect, by combining second embodiment method with first embodiment scheme, even when duty cycle setting resolution (clock frequency) associated with the shift amount setting value is low, the detection error of the rotation angle $\theta$ (the rotation speed $d\theta/dt$) can be sufficiently reduced using the correction equation. Even when the performance of the microcomputer MCU is low, satisfactory detection accuracy can be obtained.

Fourth Embodiment

<Outline of Resolver Correction Device>

Figure 16A:
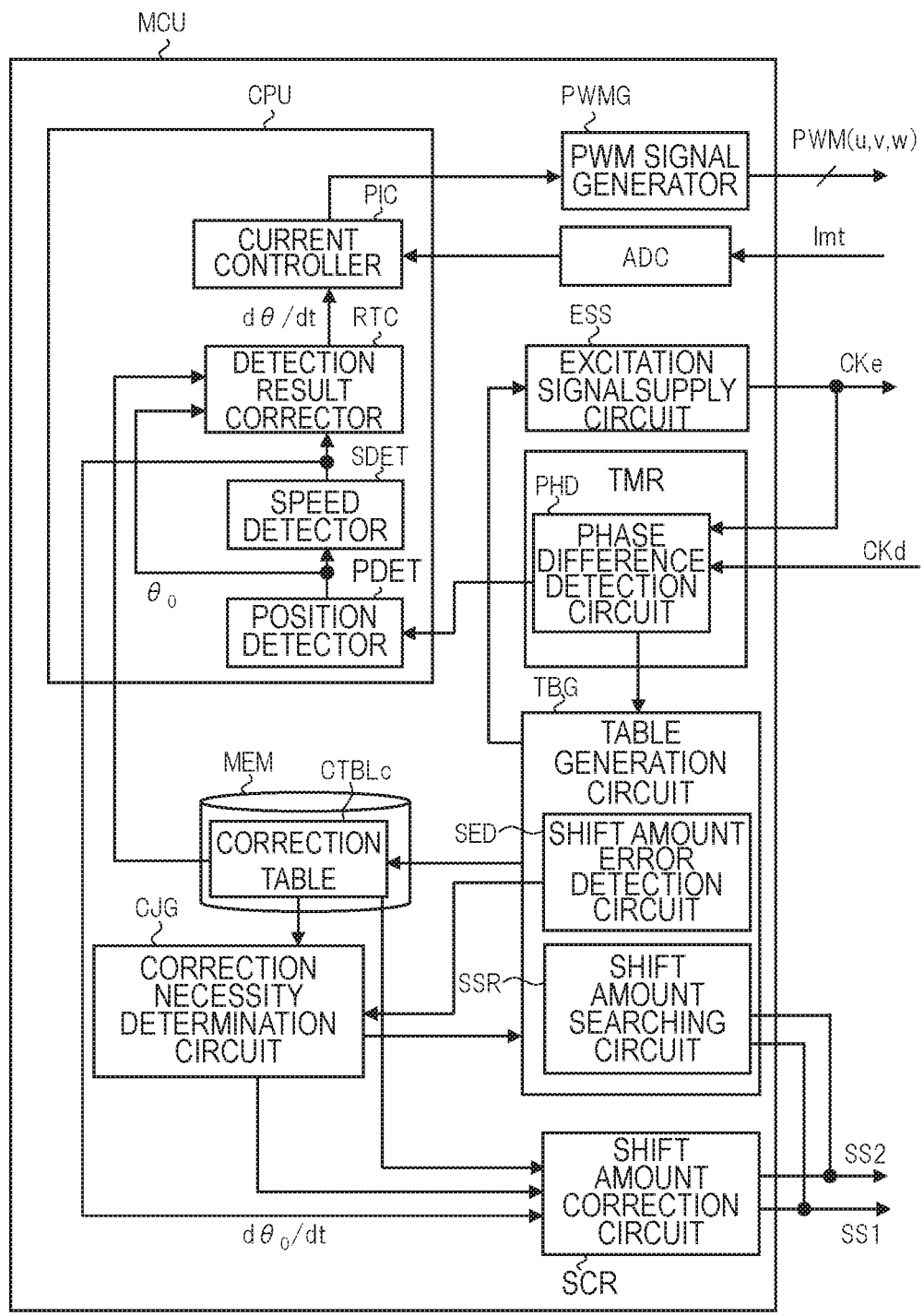
FIG. 16A is a schematic diagram showing a configuration example of the microcomputer in resolver correction device according to fourth embodiment.

FIG. 16A is a schematic diagram showing an exemplary configuration of the microcomputer in the resolver correction device according to the present fourth embodiment. The microcomputer MCU of FIG. 16A further comprises a correction necessity determination circuit CJG for the exemplary configuration of FIG. 12A. The correction necessity determination circuit CJG are implemented, for example, by software-processing by processor CPU, but may be implemented in other implementations. The correction necessity determination circuit CJG, for example, prior to starting the motor MT, etc., operates with the excitation signal supply circuit ESS supplying the excitation signal VIN of the excitation frequency fexc to the phase shifters PSF1 and PSF2, and the shift amount correction circuit SCR setting the shift amount setting values SS1, SS2 corresponding to the excitation frequency fexc based on the correction table CTBLc.

In this condition, the correction necessity determination circuit CJG causes the shift amount error detection circuit SED to detect the shift amount error $\Delta\varphi_0$ and $\Delta\varphi_1$ corresponding to the excitation frequency fexc in the phase shifters PSF1 and PSF2. Then, the correction necessity determination circuit CJG compares the shift amount error $\Delta\varphi_0$, $\Delta\varphi_1$ is detection result, the shift amount error $\Delta\varphi_0$, $\Delta\varphi_1$ held in the correction table CTBLc. The correction necessity determination circuit CJG selects whether the calibration operation [3] shown in FIG. 14 is performed or the normal operation [3] shown in FIG. 15 is performed based on the comparative results. Specifically, the correction necessity determination circuit CJG perform the normal operation [3] when the comparison results are consistent, and the calibration operation [3] when the comparison results are inconsistent. The criterion for judging the consistent or inconsistent at this time is determined in accordance with, for example, the request accuracy of the motor systems.

Figure 16B:
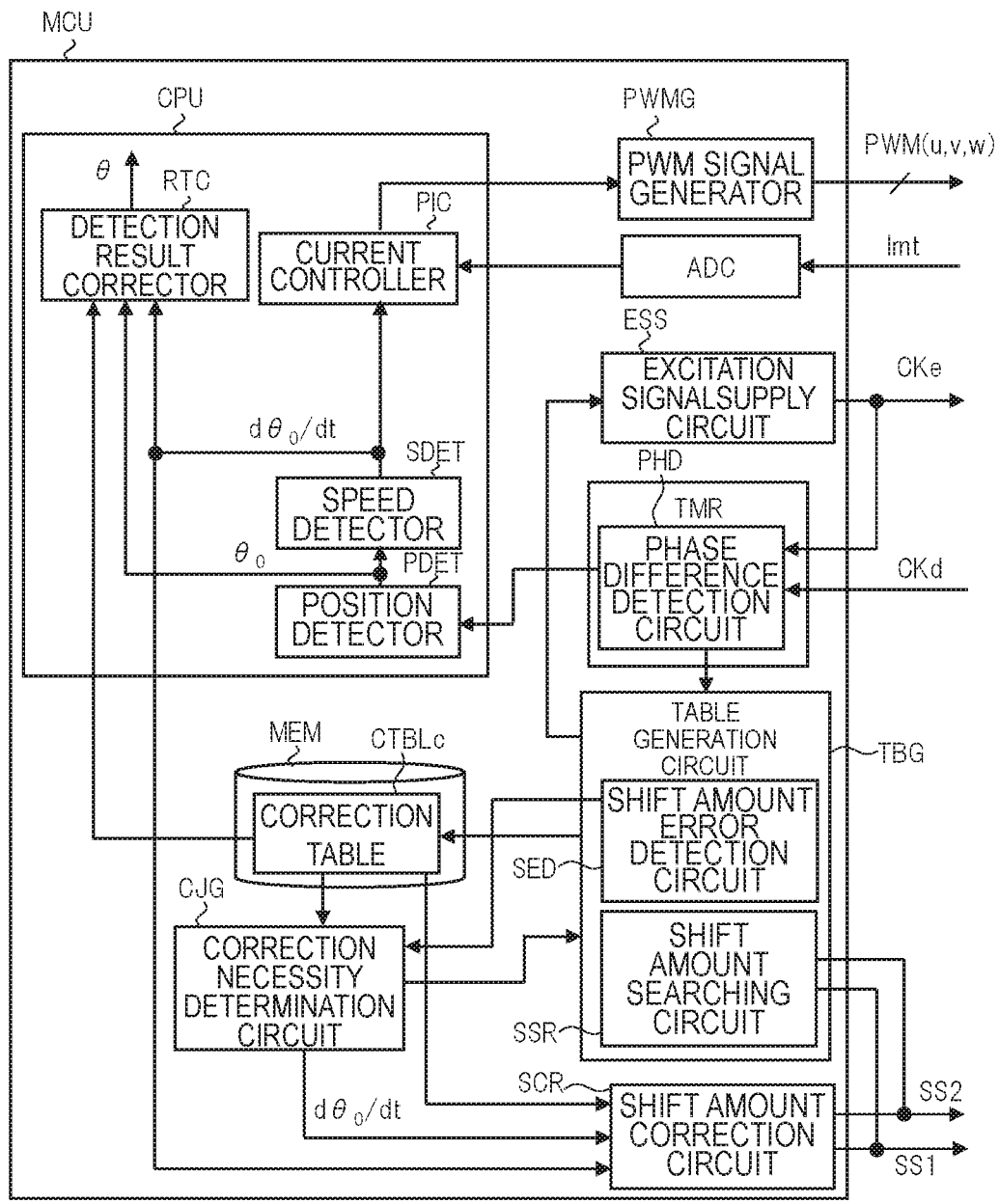
FIG. 16B is a schematic diagram showing modified example of FIG. 16A.

FIG. 16B is a schematic diagram showing modified example of FIG. 16A. In the configuration example of FIG. 16B, unlike the configuration example of FIG. 16A, the current controller PIC defines duty cycle based on the apparent rotation speed ($d\theta_0/dt$) prior to correction, as in the case of the above-described FIG. 6B. This reduces the computational burden on the control because the rotation speed from the rotation angle requires only one calculate.

<Resolver Correction Device Operation>

Figure 17:
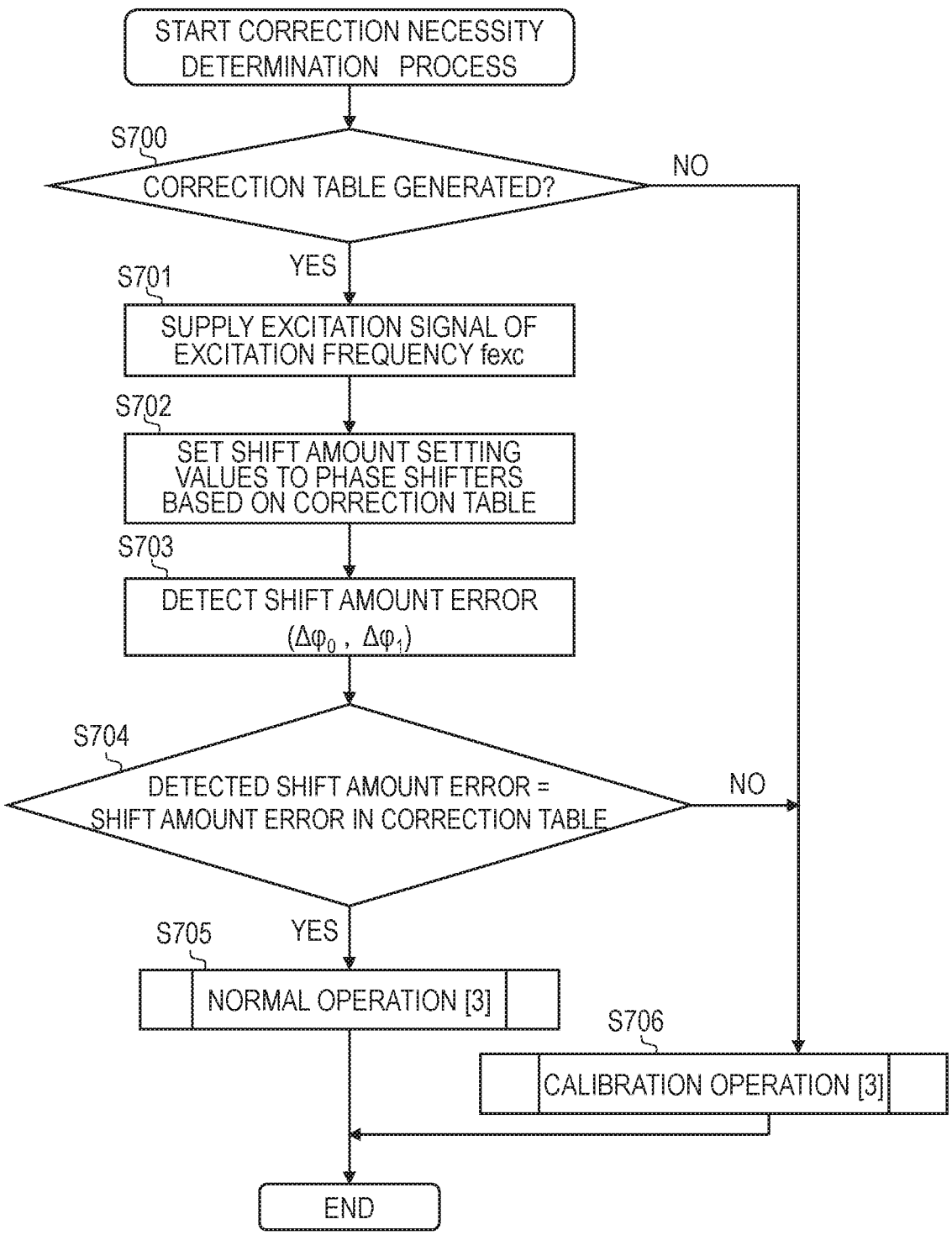
FIG. 17 is a flowchart showing an exemplary process content of a correction necessity determination circuit in FIG. 16A.

FIG. 17 is a flowchart illustrating an exemplary process of the correction necessity determination circuit in FIG. 16A. The process of FIG. 17 is performed, for example, prior to the startup of the motor MT, immediately after the power-on of the microcomputer MCU and the resolver digital converter RDC, during the waiting period of the motor MT, or upon receiving an instruction from the user, etc. In FIG. 17, the correction necessity determination circuit CJG determines whether or not the correction table CTBLc has been generated in the storage circuit MEM (step S700). The storage circuit MEMs may be, for example, nonvolatile memories.

If the correction table CTBLc is not generated in the step S700, the correction necessity determination circuit CJG starts the calibration operation [3] in FIG. 14 (step S706). On the other hand, if the correction table CTBLc has been generated in the step S700, the correction necessity determination circuit CJG causes the excitation signal supply circuit ESS to provide the excitation clock signal CKd (and thus the excitation signal VIN) of the excitation frequency fexc (step S701).

Subsequently, the correction necessity determination circuit CJG issues an instruction to the shift amount correction circuit SCR, and in response, the shift amount correction circuit SCR sets the shift amount setting values SS1, SS2 corresponding to the excitation frequency fexc obtained from the correction table CTBLc to the phase shifters PSF1, PSF2 (step S702). The correction necessity determination circuit CJG then causes the shift amount error detection circuit SED to detect the shift amount error $\Delta\varphi_0$, $\Delta\varphi_1$ (step S703). Specifically, the shift amount error detection circuit SED detect the shift amount error $\Delta\varphi_0$ and $\Delta\varphi_1$ while switching the calibration path, as shown in the steps S303, S304, S306, S307 of FIG. 9.

Then, in step S704, the correction necessity determination circuit CJG compares the shift amount error $\Delta\varphi_0$ and $\Delta\varphi_1$ detected in step S703 with the shift amount error $\Delta\varphi_0$ and $\Delta\varphi_1$ corresponding to the excitation frequency fexc in the correction table CTBLc. The correction necessity determination circuit CJG starts the normal operation [3] in FIG. 15 when the comparison result in the step S704 is consistent (step S705), and starts the calibration operation [3] in FIG. 14 when the comparison result in the step S704 is inconsistent (step S706).

Here, the correction necessity determination circuit CJG has automatically started the normal operation [3] or the calibration operation [3], but it may perform a process such that this activation is left to the user. Specifically, the correction necessity determination circuit CJG assigns flags to the case of "No" of the step S700 and the case of "Yes" and "No" of the step S704, respectively, and notifies the user of the flags. The user instructs the resolver correction device to execute the normal operation [3] or the calibration operation [3] based on the flag.

Fourth Embodiment's Main Benefits

The use of fourth embodiment's the resolver correction device allows the rotation angle θ (the rotation speed dθ/dt) detection error due to resolver RSV to be reduced while reducing the number of calibration operation in addition to the various benefits described in third embodiment. More specifically, frequent the calibration operation may reduce the utilization rate of the systems. On the other hand, when using the results of the calibration operation for a long period of time, for example, the environmental change of the system (temperature or the like) and, due to aging of the circuit elements, there is a possibility that the detection error is increased.

When fourth embodiment method is used, the necessity of the calibration operation can be determined so that the calibration operation can be performed only when it is truly required. Further, since the necessity determination of the calibration operation is performed by a single the excitation frequency fexc, the time required for the necessity determination is not particularly problematic. In this example, although the correction necessity determination circuit CJG is added to the configuration example of FIG. 12A, in the same manner, it may be added the correction necessity determination circuit CJG to the configuration example of FIG. 6A.

Although the invention made by the present inventor has been specifically described based on the embodiment, the present invention is not limited to the embodiment described above, and various modifications can be made without departing from the gist thereof. For example, the foregoing embodiments have been described in detail for the purpose of illustrating the present invention easily, and are not necessarily limited to those comprising all the configurations described. In addition, a part of the configuration of one embodiment can be replaced with the configuration of another embodiment, and the configuration of another embodiment can be added to the configuration of one embodiment. It is also possible to add, delete, or replace some of the configurations of the respective embodiments.

What is claimed is:

1. A resolver correction device comprising:
    a first phase shifter for outputting a first phase signal by shifting a phase of a first detection signal is one of quadrature detection signals of the resolver by a first shift amount in accordance with a first shift amount setting value;
    a second phase shifter for outputting a second phase signal by shifting a phase of a second detection signal is the other of the quadrature detection signals by a second shift amount in accordance with a second shift amount setting value;
    an add circuit for outputting a third phase signal by adding the first phase signal and the second phase signal;
    an excitation signal supply circuit for supplying an excitation signal of an excitation frequency to the resolver during a normal operation, for supplying the excitation signals of a plurality of frequencies including the excitation frequency to the first phase shifter or the second phase shifter during a calibration operation;
    a phase difference detection circuit detecting a rotation angle of the resolver during the normal operation, and detecting the first shift amount or the second shift amount during the calibration operation, by detecting an phase difference between the excitation signal from the excitation signal supply circuit and the third phase signal from the add circuit;
    a shift amount searching circuit for searching the first shift amount setting value for each frequency of the excitation signal such that the first shift amount becomes a first specified amount, and for searching the second shift amount setting value for each frequency of the excitation signal such that the second shift amount becomes a second specified amount different by 90 degrees from the first specified amount, while referring to the detection result of the phase difference detection circuit during the calibration operation; and a storage circuit for storing the first shift amount setting value and the second shift amount setting value for each frequency of the excitation signal obtained by a search result of the shift amount searching circuit as a correction table.

2. The resolver correction device according to claim 1, further comprising:

a speed detector for detecting a rotation speed of the resolver based on a change rate of the rotation angle of the resolver detected by the phase difference detection circuit during the normal operation; and a shift amount correction circuit for calculating an output frequency of the first detection signal or the second detection signal based on the rotation speed detected by the speed detector and the excitation frequency of the excitation signal, for obtaining the first shift amount setting value and the second shift amount setting value by referring to the correction table by the output frequency as a search key, for setting the first shift amount setting value to the first phase shifter and for setting the second shift amount setting value to the second phase shifter during the normal operation.

3. The resolver correction device according to claim 2, wherein the first phase shifter and the second phase shifter include an RC circuit comprising a capacitance and a plurality of resistors, respectively, wherein the first phase shifter controls the shift amount by switching enable or disable for a portion of the plurality of resistors in the RC circuit of the first phase shifter by a first PWM signal, wherein the second phase shifter controls the shift amount by switching enable or disable for a portion of the plurality of resistors in the RC circuit of the second phase shifter by a second PWM signal, wherein the first shift amount setting value is a duty cycle of the first PWM signal, and wherein the second shift amount setting value is a duty cycle of the second PWM signal.

4. The resolver correction device according to claim 1, wherein the excitation signal supply circuit supplies the excitation signal to the resolver, the rotation of the resolver is controlled to a stopped state, the add circuit outputs the first phase signal or the second phase signal as the third phase signal by the second phase signal or the first phase signal is disabled, during the calibration operation.

5. The resolver correction device according to claim 1, further comprising:

a selection switch for selecting whether to supply the excitation signal from the excitation signal supply circuit to the resolver, the first phase shifter, or to any of the second phase shifter.

6. The resolver correction device according to claim 1, further comprising:

a shift amount error detection circuit for detecting the first shift amount error remaining in the first shift amount detected by the phase difference detection circuit and a second shift amount error remaining in the second shift amount for each frequency of the excitation signal, after reflecting the first shift amount setting value and the second shift amount setting value which are a search result of the shift amount searching circuit, during the calibration operation; and a detection result corrector, wherein the correction table of the storage circuit further stores the first shift amount error and the second shift amount error for each frequency of the excitation signals detected by the shift amount error detection circuit, and wherein the detection result corrector corrects the rotation angle of the resolver detected by the phase difference detection circuit based on a storing content of the correction table and a predetermined arithmetic expression during the normal operation.

7. The resolver correction device according to claim 6, further comprising:

a speed detector for detecting a rotation speed of the resolver based on a change rate of the rotation angle of the resolver detected by the phase difference detection circuit during the normal operation; and a shift amount correction circuit for calculating an output frequency of the first detection signal or the second detection signal based on the rotation speed detected by the speed detector and the excitation frequency of the excitation signal, for obtaining the first shift amount setting value and the second shift amount setting value by referring to the correction table by the output frequency as a search key, for setting the first shift amount setting value to the first phase shifter and for setting the second shift amount setting value to the second phase shifter during the normal operation.

8. The resolver correction device according to claim 7, wherein the detection result corrector calculates the output frequency of the first detection signal or the output frequency of the second detection signal based on the rotation speed detected by the speed detector and the excitation frequency of the excitation signal, obtains the first shift amount error and the second shift amount error by referring to the correction table using the output frequency as a search key, and corrects the rotation angle of the resolver based on the arithmetic expression as parameters which are the first shift amount error, the second shift amount error, and the rotation angle of the resolver detected by the phase difference detection circuit.

9. The resolver correction device according to claim 7, further comprising:

a correction necessity determination circuit for detecting the first shift amount error and the second shift amount error corresponding to the excitation frequency in the shift amount error detection circuit, for comparing the first shift amount error and the second shift amount error as a detection result, and the first shift amount error and the second shift amount error stored in the correction table, and for selecting whether to perform the calibration operation or the normal operation based on the comparison result, in a state where wherein the excitation signal supply circuit supplies the excitation signal of the excitation frequency with respect to the first phase shifter or the second phase shifter, and the shift amount correction circuit sets the first shift amount setting value and the second shift amount setting value corresponding to the excitation frequency.

10. A resolver correction device comprising:

a first phase shifter for outputting a first phase signal by shifting a phase of a first detection signal is one of quadrature detection signals of the resolver by a first shift amount in accordance with a first shift amount setting value;

a second phase shifter for outputting a second phase signal by shifting a phase of a second detection signal is the other of the quadrature detection signals by a second shift amount in accordance with a second shift amount setting value;

an add circuit for outputting a third phase signal by adding the first phase signal and the second phase signal;

an excitation signal supply circuit for supplying an excitation signal of an excitation frequency to the resolver at a normal operation, for supplying the excitation signals of a plurality of frequencies including the excitation frequency to the first phase shifter or the second phase shifter at a calibration operation;

a phase difference detection circuit detecting a rotation angle of the resolver during the normal operation, and detecting the first shift amount or the second shift amount during the calibration operation, by detecting an phase difference between the excitation signal from the excitation signal supply circuit and the third phase signal from the add circuit;

a shift amount error detection circuit for detecting a first shift amount error included in the first shift amount detected by the phase difference detection circuit, for each frequency of the excitation signal based on a first specified amount which is determined in advance, and for detecting a second shift amount error included in the second shift amount detected by the phase difference detection circuit, for each frequency of the excitation signal based on a second specified amount which is 90 degrees different from the first specified amount at a calibration operation;

a storage circuit storing for storing the first shift amount error and the second shift amount error for each frequency of the excitation signals detected by the shift amount error detection circuit as a correction table; and a detection result corrector for correcting the rotation angle of the resolver detected by the phase difference detection circuit based on a storing content of the correction table and a predetermined arithmetic expression at the normal operation.

11. The resolver correction device according to claim 10, further comprising:
a shift amount setting circuit for searching the first shift amount setting value such that the first shift amount becomes the first specified amount, and for searching the second shift amount setting value such that the second shift amount becomes the second specified amount while referring to detection result of the phase difference detection circuit with the excitation signal set to the excitation frequency as an initial operation during the calibration operation,
wherein the shift amount setting circuit sets the first shift amount setting value and the second shift amount setting value which are the search result, to the first phase shifter and the second phase shifter at the time of the calibration operation and at the time of the normal operation.

12. The resolver correction device according to claim 10, further comprising:
a speed detector for detecting a rotation speed of the resolver based on a change rate of the rotation angle of the resolver detected by the phase difference detection circuit during the normal operation, wherein the detection result corrector calculates the output frequency of the first detection signal or the output frequency of the second detection signal based on the rotation speed detected by the speed detector and the excitation frequency of the excitation signal, obtains the first shift amount error and the second shift amount error by referring to the correction table using the output frequency as a search key, and corrects the rotation angle of the resolver based on the arithmetic expression as parameters which are the first shift amount error, the second shift amount error, and the rotation angle of the resolver detected by the phase difference detection circuit.

13. The resolver correction device according to claim 11, wherein the first phase shifter and the second phase shifter include an RC circuit comprising a capacitance and a plurality of resistors, respectively,
wherein the first phase shifter controls the shift amount by switching enable or disable for a portion of the plurality of resistors in the RC circuit of the first phase shifter by a first PWM signal,
wherein the second phase shifter controls the shift amount by switching enable or disable for a portion of the plurality of resistors in the RC circuit of the second phase shifter by a second PWM signal,
wherein the first shift amount setting value is a duty cycle of the first PWM signal, and
wherein the second shift amount setting value is a duty cycle of the second PWM signal.

14. The resolver correction device according to claim 10, wherein the excitation signal supply circuit supplies the excitation signal to the resolver, the rotation of the resolver is controlled to a stopped state, the add circuit outputs the first phase signal or the second phase signal as the third phase signal by the second phase signal or the first phase signal is disabled, during the calibration operation.

15. The resolver correction device according to claim 10, further comprising:
a selection switch for selecting whether to supply the excitation signal from the excitation signal supply circuit to the resolver, the first phase shifter, or to any of the second phase shifter.

16. The resolver correction device according to claim 11, further comprising:
a correction necessity determination circuit for detecting the first shift amount error and the second shift amount error corresponding to the excitation frequency in the shift amount error detection circuit, for comparing the first shift amount error and the second shift amount error as a detection result, and the first shift amount error and the second shift amount error stored in the correction table, and for selecting whether to perform the calibration operation or the normal operation based on the comparison result, in a state where wherein the excitation signal supply circuit supplies the excitation signal of the excitation frequency with respect to the first phase shifter or the second phase shifter, and the shift amount correction circuit sets the first shift amount setting value and the second shift amount setting value corresponding to the excitation frequency.

17. A correction method of a resolver correction device comprising:
a first phase shifter for outputting a first phase signal by shifting a phase of a first detection signal is one of quadrature detection signals of the resolver by a first shift amount in accordance with a first shift amount setting value;

a second phase shifter for outputting a second phase signal by shifting a phase of a second detection signal is the other of the quadrature detection signals by a second shift amount in accordance with a second shift amount setting value;

an add circuit for outputting a third phase signal by adding the first phase signal and the second phase signal;

a storage circuit for including a correction table, wherein the correction method comprising the step of:

(a) supplying an excitation signal of an excitation frequency to the resolver during a normal operation, for supplying the excitation signals of a plurality of frequencies including the excitation frequency to the first phase shifter or the second phase shifter during a calibration operation, (b) detecting a rotation angle of the resolver during the normal operation, and detecting the first shift amount or the second shift amount during the calibration operation, by detecting an phase difference between the excitation signal supplied in the step of (a) and the third phase signal from the add circuit, (c) searching for the first shift amount setting value for each frequency of the excitation signal such that the first shift amount becomes a first specified amount, and for searching for the second shift amount setting value for each frequency of the excitation signal such that the second shift amount becomes a second specified amount different by 90 degrees from the first specified amount, while referring to the detection result of the phase difference detection circuit in the calibration operation, and (d) storing the first shift amount setting value and the second shift amount setting value for each frequency of the excitation signal obtained by a search result in step of (c) in the correction table.

18. The correction method according to claim 17, further comprising the step of:

(e) detecting a rotation speed of the resolver based on a change rate of the rotation angle of the resolver detected in the step of (d) during the normal operation; and (f) calculating an output frequency of the first detection signal or the second detection signal based on the rotation speed detected in the step of (e) and the excitation frequency of the excitation signal, for obtaining the first shift amount setting value and the second shift amount setting value by referring to the correction table by the output frequency as a search key, for setting the first shift amount setting value to the first phase shifter and for setting the second shift amount setting value to the second phase shifter during the normal operation.

19. The correction method according to claim 17, further comprising the step of:

(g) detecting the first shift amount error remaining in the first shift amount detected by the phase difference detection circuit and a second shift amount error remaining in the second shift amount for each frequency of the excitation signal, after reflecting the first shift amount setting value and the second shift amount setting value which are a search result of the shift amount searching circuit, during the calibration operation, and storing the first shift amount error and the second shift amount error for each frequency of the excitation signals detected by the shift amount error detection circuit; and (h) correcting the rotation angle of the resolver detected in the step of (b) based on a storing content of the correction table and a predetermined arithmetic expression during the normal operation.

20. The correction method according to claim 19, further comprising the step of:

(i) detecting a rotation speed of the resolver based on a change rate of the rotation angle of the resolver detected in the step of (b) during the normal operation (j) calculating an output frequency of the first detection signal or the second detection signal based on the rotation speed detected in the step of (i) and the excitation frequency of the excitation signal, for obtaining the first shift amount setting value and the second shift amount setting value by referring to the correction table by the output frequency as a search key, for setting the first shift amount setting value to the first phase shifter and for setting the second shift amount setting value to the second phase shifter during the normal operation, wherein, in the step of (h), the output frequency of the first detection signal or the output frequency of the second detection signal are calculated based on the rotation speed detected in the step of (i) and the excitation frequency of the excitation signal, the first shift amount error and the second shift amount error are obtained by referring to the correction table using the output frequency as a search key, and the rotation angle of the resolver is corrected based on the arithmetic expression as parameters which are the first shift amount error, the second shift amount error, and the rotation angle of the resolver detected by the phase difference detection circuit.

* * * * *